(12) United States Patent  
Brodeur et al.

(10) Patent No.: US 7,802,644 B2  
(45) Date of Patent: Sep. 28, 2010

(54) SNOWMOBILE HOOD ATTACHMENT SYSTEM

(75) Inventors: Jacques Brodeur, Granby (CA); Claude Vaillancourt, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 771 days.

(21) Appl. No.: 11/563,003

(22) Filed: Nov. 23, 2006

(65) Prior Publication Data

US 2007/0158123 A1  Jul. 12, 2007

Related U.S. Application Data

(60) Provisional application No. 60/738,979, filed on Nov. 23, 2005.

(51) Int. Cl.  
*B62D 25/10* (2006.01)

(52) U.S. Cl. ............... 180/69.24; 180/69.2; 180/69.21; 180/190

(58) Field of Classification Search .............. 180/69.2, 180/69.21, 9.25, 190; 296/193.11  
See application file for complete search history.

(56) References Cited

U.S. PATENT DOCUMENTS

| | | | | |
|---|---|---|---|---|
| 3,572,813 | A * | 3/1971 | Takada | 296/193.11 |
| 3,688,856 | A * | 9/1972 | Boehm et al. | 180/190 |
| 4,437,529 | A * | 3/1984 | Fralish | 180/69.2 |
| 5,048,154 | A * | 9/1991 | Swartzendruber | 16/267 |
| 6,439,328 | B1 * | 8/2002 | Vaillancourt et al. | 180/68.1 |
| 6,712,405 | B2 * | 3/2004 | Desmarais et al. | 292/113 |
| 7,121,370 | B2 * | 10/2006 | Bedard et al. | 180/69.2 |
| 7,147,074 | B1 * | 12/2006 | Berg et al. | 180/190 |
| 2004/0108153 | A1 * | 6/2004 | Bedard et al. | 180/190 |

\* cited by examiner

*Primary Examiner*—Paul N Dickson  
*Assistant Examiner*—Katy Meyer  
(74) *Attorney, Agent, or Firm*—Olser, Hoskin & Harcourt LLP

(57) ABSTRACT

A snowmobile having a hood releasably secured to the snowmobile via interlocking male-female members, the hood being manually releasable from the snowmobile without the use of tools. A snowmobile having a hood releasably secured to the snowmobile via a hook and elastic connector, and having fairings with a moveable section constructed and arranged to conceal or cover the hook and elastic connector.

12 Claims, 11 Drawing Sheets

SNOWMOBILE HOOD ATTACHMENT SYSTEM

This application claims priority to U.S. provisional application Ser. No. 60/738,979, filed Nov. 23, 2005, which is incorporated herein by reference.

FIELD OF THE INVENTION

The present invention relates to snowmobiles, and more particularly, snowmobile hood attachment systems.

BACKGROUND OF THE INVENTION

Conventional snowmobiles have a set of fairings at the front thereof surrounding the engine. While different snowmobiles may have different reasons for employing such fairings, some typically are improving the aerodynamics of the snowmobile, improving the aesthetics of the snowmobile, protecting the engine and surrounding components from the environment, and protecting against inadvertent contact of the engine.

Typically, these fairings comprise a hood covering (and usually defining) the upper portion of the engine compartment and a belly pan covering (and usually defining, at least in part) the bottom portion of the engine compartment. The fairings may also comprise one or more movable side panels, depending on the particular construction of the vehicle.

The prior art snowmobile 1000, a SKI-DOO™ MX-Z™ manufactured by Bombardier Recreational Products of Valcourt, Canada, shown in FIGS. 1 and 2 provides a good illustration of conventional fairings. Snowmobile 1000 has a hood 1002 and a belly pan 1004 that form collectively the fairings 1006 of the vehicle.

The hood 1002 of the snowmobile 1000 is affixed at the front portion thereof via a conventional hinge (not shown) via bolts or rivets, so that it may swing open about a lateral axis toward the front of the vehicle and permit access to the engine 1008 and other components in the engine compartment. The hood 1002 is shown in FIG. 1 in a closed position and in FIG. 2 in an open position.

Referring to FIG. 2, when the hood 1002 is being opened, to prevent it from over rotating and swinging completely forward and breaking, a wire or small cord 1010 is attached between the hood 1002 and a point on the snowmobile. Thus, in the open position, the hood 1002 is pivoted forward enough so that its center of gravity is forward of the hinge thus urging the hood to flip all the way open. The wire 1010 is long enough to let the center of gravity of the hood 1002 pass the hinge, but not long enough to allow the hood 1002 to over-rotate and break. The weight of the hood 1002 against the wire 1010 holds the hood 1002 in the open position.

While this construction is adequate to enjoy the sport of snowmobiling, there are some drawbacks with this design, particularly, in very windy conditions. In this respect, when the hood 1002 is opened in the direction of the blowing wind, the relatively large surface area of the hood 1002 catches a lot of wind. The force created in this situation can be sufficient to break the wire 1010 itself or to cause the wire to become unattached from either the hood 1002 or snowmobile body. Because it is desirable to use components in the manufacture of a snowmobile that are as light as possible (as at times the snowmobile must be moved by hand), the hood 1002 is typically made of plastic. Therefore the force required to break the wire 1010 free from the hood is (typically at its point of attachment to the hood) not that great. A broken hood is clearly undesirable.

In a different order of things, FIG. 3, which is a partial rear perspective view of the snowmobile 1, shows one prior art embodiment of how the hood 1002 is held closed (during operation of the snowmobile 1000). As shown in FIG. 3, a latch fastener 1012 may be employed. The latch fastener 1012 includes an elastic connector 1014 and a hook 1016. The elastic connector 1014 is anchored or secured to the snowmobile 1000 (typically to a metal portion thereof) using a fastener 1018. The elastic connector 1014 includes an opening 1020. The hook 1016 is provided on the hood 1002 and cooperates with the opening to maintain the hood 1002 in a closed position. Specifically, to secure the hood 1002 in the closed position the elastic connector 1014 is stretched until the opening 1020 can be passed over the hook 1016, and the elastic connector 1014 is released such that the hook 1016 is secured in place via the elastic connector 1014, preferably under a predetermined tension. In the coupled position, the hook 1016 protrudes through and out of the opening 1020 such that the hook 1016 remains exposed to the surrounding environment.

Again, while this configuration is completely adequate to enjoy the sport of snowmobiling, there are some drawbacks to this configuration. Specifically, the hook 1016 is exposed (outside of the fairings) and thus can be contacted while riding or being seated on the snowmobile 1000 such that loose clothing or other material may inadvertently become momentarily caught on the hook 1016. The hook 1016 is also in plain view and is not aesthetically pleasing.

In view of the above, it would be desirable to have a hood attachment system that ameliorates some of the drawbacks noted above with current systems.

SUMMARY OF THE INVENTION

Thus, as embodied and broadly described herein, in one aspect, the present invention provides a snowmobile, comprising: a frame including a tunnel; an engine supported by the frame; an endless drive track below the tunnel and supported by the frame, the endless drive track being operatively connected to the engine to propel the snowmobile; a straddle seat above the tunnel and supported by the frame; two steering skis forward of the tunnel and supported by the frame; handlebars disposed on the frame forward of the seat, the handlebars being operatively connected to the skis to steer the snowmobile; and fairings supported by the frame, the fairings including a hood, the hood being releasably secured to the snowmobile at least via interlocking male-female connectors, the hood being manually releasable from the snowmobile without the use of tools.

The expression "male-female connectors" in the context of the present application includes all mating structures wherein one portion thereof penetrates another in order to interlock the two. For example, it is not necessary that the male potion be perfectly cylindrical or pin shaped, as for example, L-shaped structures should be understood as being included in the male portions. In such a case, the female portion might be a slot into which the L-shaped male portion is first inserted and then slid (into an interlocking position). Nor is it necessary that the mating structures each be singularly male or female, one or both of them could be simultaneously both.

The expression "tools" in the context of the present invention includes hand held manual tools such as screwdrivers, wrenches, pliers, and the like; as well as electric or battery operated tools such as drills. It is not meant to include keys that operate locks locking the hood to the snowmobile.

One advantage of this aspect of the present invention is that the hood is manually releasable from the snowmobile, such that, should it be desirable to access the engine compartment of the snowmobile under windy conditions, a person may simply remove the hood altogether and place it on the ground next to the snowmobile (for example). Thus he or she need not be concerned with whether the wind will catch the hood and break it, or make it difficult or impossible to maintain the hood in an open position (depending on the orientation of the snowmobile with respect to the wind). Further, the hood is manually releasable from the snowmobile without the use of tools so that it is not necessary to carry any such tools on the snowmobile, thereby eliminating the risk of not having the tool and the weight added by carrying such tools around. Given the generally cold weather conditions in which snowmobiles are operated, it is preferred, although certainly not required, that the hood be manually releasable by gloved hands (as opposed to naked hands).

Preferably, there is more than one set of interlocking male-female connectors, most preferably two sets, that releasably secure the hood to the snowmobile. However, depending on the configuration of the hood and snowmobile, a single set would be possible.

Preferably, the hood has a forward end and a rearward end and portions of the interlocking male-female connectors disposed on the hood, e.g. in most cases either one of the male connector or the female connector, are located closer to the forward end of the hood than the rearward end of the hood. The forward end and rearward end should be understood as being defined with respect to the forward direction of travel of the snowmobile.

It is preferred that the male connectors be disposed on the hood and the female connectors be disposed on the snowmobile. However the reverse configuration, with the female connectors disposed on the hood and the male connectors disposed on the snowmobile, is also within the scope of the present invention.

While no particular shape of the male connectors is required, it is preferred that the male connectors be shaped such that securing the hood to the snowmobile through insertion of the male connectors into the female connectors requires movement of the hood in more than one direction. An example would be the preferred L-shaped male connector described above. This would discourage inadvertent releasing of the hood from the snowmobile.

In addition to the interlocking male-female connectors, it is preferred that the hood be further releasably secured to the snowmobile via a hook and an elastic connector having an opening therein for receiving the hook. It is more preferred that one of the hook and elastic connector be disposed on the hood closer to the rearward end of the hood than to the forward end of the hood.

Where such hooks and elastic connectors are employed, it is highly preferred that the fairings further include a section movable between an open position and a closed position, that the fairings be constructed and arranged on the snowmobile such that in the closed position, the section conceals the hook and the elastic connector from view and/or covers the hook and the elastic connector. This aspect of the invention is described below.

In another aspect, as embodied and broadly described herein, the present invention provides a hood suitable for use on a snowmobile having: a frame including a tunnel; an engine supported by the frame; an endless drive track below the tunnel and supported by the frame, the endless drive track being operatively connected to the engine to propel the snowmobile; a straddle seat above the tunnel and supported by the frame; two steering skis forward of the tunnel and supported by the frame; handlebars disposed on the frame forward of the seat, the handlebars being operatively connected to the skis to steer the snowmobile; a system for releasably securing the hood to the snowmobile without the use of tools, the system including portions of male-female connectors disposed on the snowmobile and at least one of a hook and a corresponding elastic connector with an opening; the hood comprising: a body; portions of male-female connectors disposed on the body and configured to mate with the portions of male-female connectors disposed on the snowmobile; and at least the other of the hook and the corresponding elastic connector disposed on the body.

In yet another aspect, as embodied and broadly described herein, the present invention provides a method of releasably securing, without the use of tools, a hood on a snowmobile, the snowmobile having, a frame including a tunnel; an engine supported by the frame; an endless drive track below the tunnel and supported by the frame, the endless drive track being operatively connected to the engine to propel the snowmobile; a straddle seat above the tunnel and supported by the frame; two steering skis forward of the tunnel and supported by the frame; handlebars disposed on the frame forward of the seat, the handlebars being operatively connected to the skis to steer the snowmobile; a system for releasably securing the hood to the snowmobile without the use of tools, the system including portions of male-female connectors disposed on the snowmobile and at least one of a hook and a corresponding elastic connector with openings; the hood having, a body; portions of male-female connectors disposed on the body and configured to mate with the portions of male-female connectors disposed on the snowmobile; and at least the other of the hook and the corresponding elastic connector disposed on the body; the method comprising: (i) interlocking the portions of the male-female connectors disposed on the hood with the portions of the male-female connectors disposed on the snowmobile through movement of the hood; (ii) stretching one of the elastic connectors; (iii) passing the opening of the stretched elastic connector over its corresponding hook; (iv) releasing the stretched elastic connector; and (v) if there is more than one elastic connector, repeating steps (ii) to (iv) for each of the elastic connectors of the system.

In the context of the present invention, it should be understood that the movable fairing section concealing the hook and elastic connector need not be of any particular shape or size as long as it is shaped and sized to carry out, in whole, or in part in cooperation with other movable fairing sections, its intended function, i.e. to conceal the hook and the elastic connector from view. In the latter case, i.e. where more than one movable fairing sections cooperate to conceal the hook and elastic connector from view, all such coopering sections should be considered to together be a "section" in the context of the present invention.

In the context of the present invention, the difference between the section concealing the hook and/or elastic connector from view and covering the hook and/or elastic connector is in that the latter, holes or see-through portions or the like are permitted in the section such that the hook and/or the elastic connector could be seen but not accessed when the section is in the closed position, whereas in the former the hook and/or elastic connector could not be seen.

One advantage of this aspect of the present invention is that the hook and elastic connector securing the hood to the snowmobile are concealed during the operation of the snowmobile. Thus, it is far more difficult for either the hook or the elastic connector to be inadvertently contacted by a user or other material during the operation of the snowmobile. In addition, some people will find this configuration (with the hook and the elastic connector out of view or covered), aesthetically pleasing.

Preferably, the hood is releasably secured to the snowmobile via a plurality of hooks and elastic connectors, and the fairings include a plurality of sections movable between open positions and closed positions, and the fairings are constructed and arranged on the snowmobile such in their closed positions, the sections conceal the hooks and the elastic connectors from view or cover them. In this manner, there can be at least one set of hooks and elastic connectors on each side of the snowmobile, to better secure the hood to vehicle, and each such set will have a corresponding movable fairing section to conceal it from view or cover it when closed. Preferably, there is a one to one correspondence between each pair of corresponding hooks and elastic connectors and each movable section, however, embodiments where a single movable section conceals more than one set of hooks and elastic connectors are also considered to be within the scope of the present invention.

Other aspects, objects and features of the invention will become apparent by reference to the following description and the drawings.

BRIEF DESCRIPTION OF THE DRAWINGS

Having thus generally described the nature of the invention, reference will now be made to the accompanying drawings, showing by way of illustration preferred embodiments thereof and in which.

Figure 1:
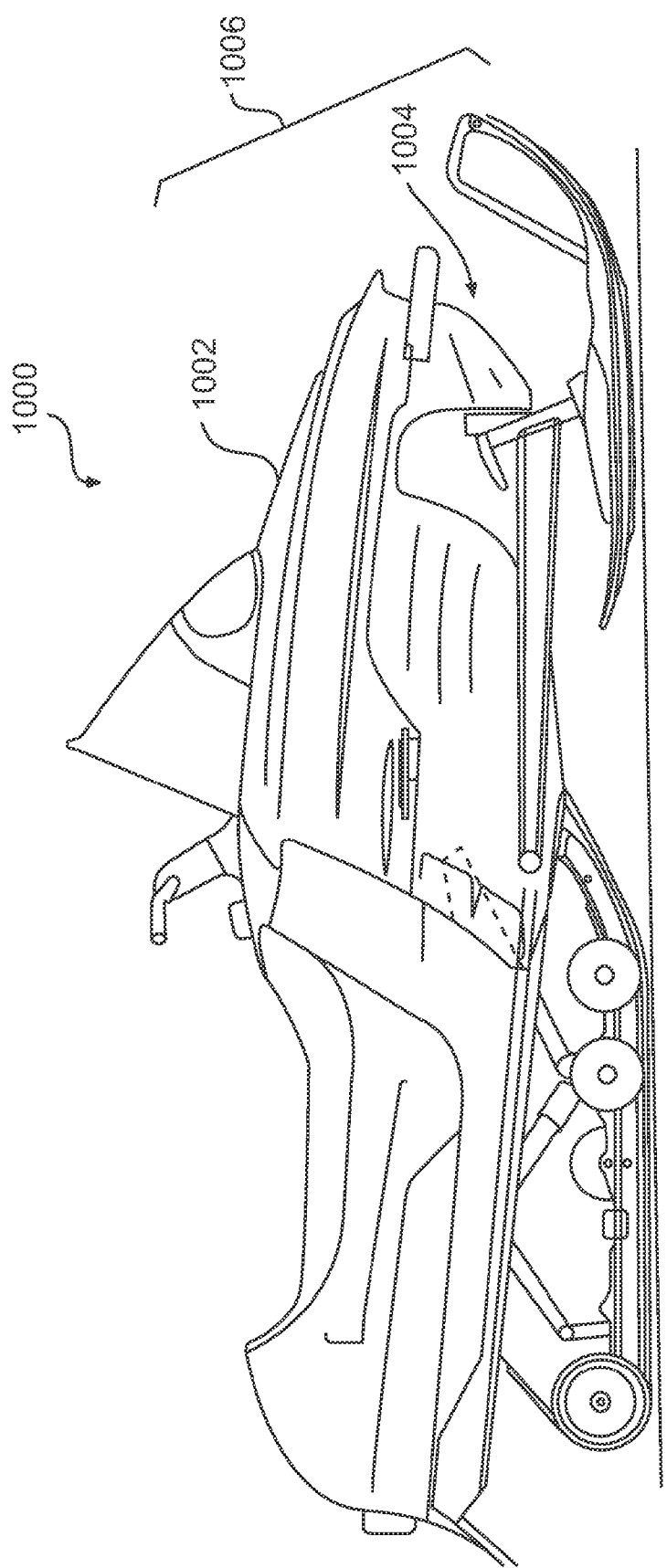
FIG. 1 is a side view of a prior art snowmobile.
Figure 2:
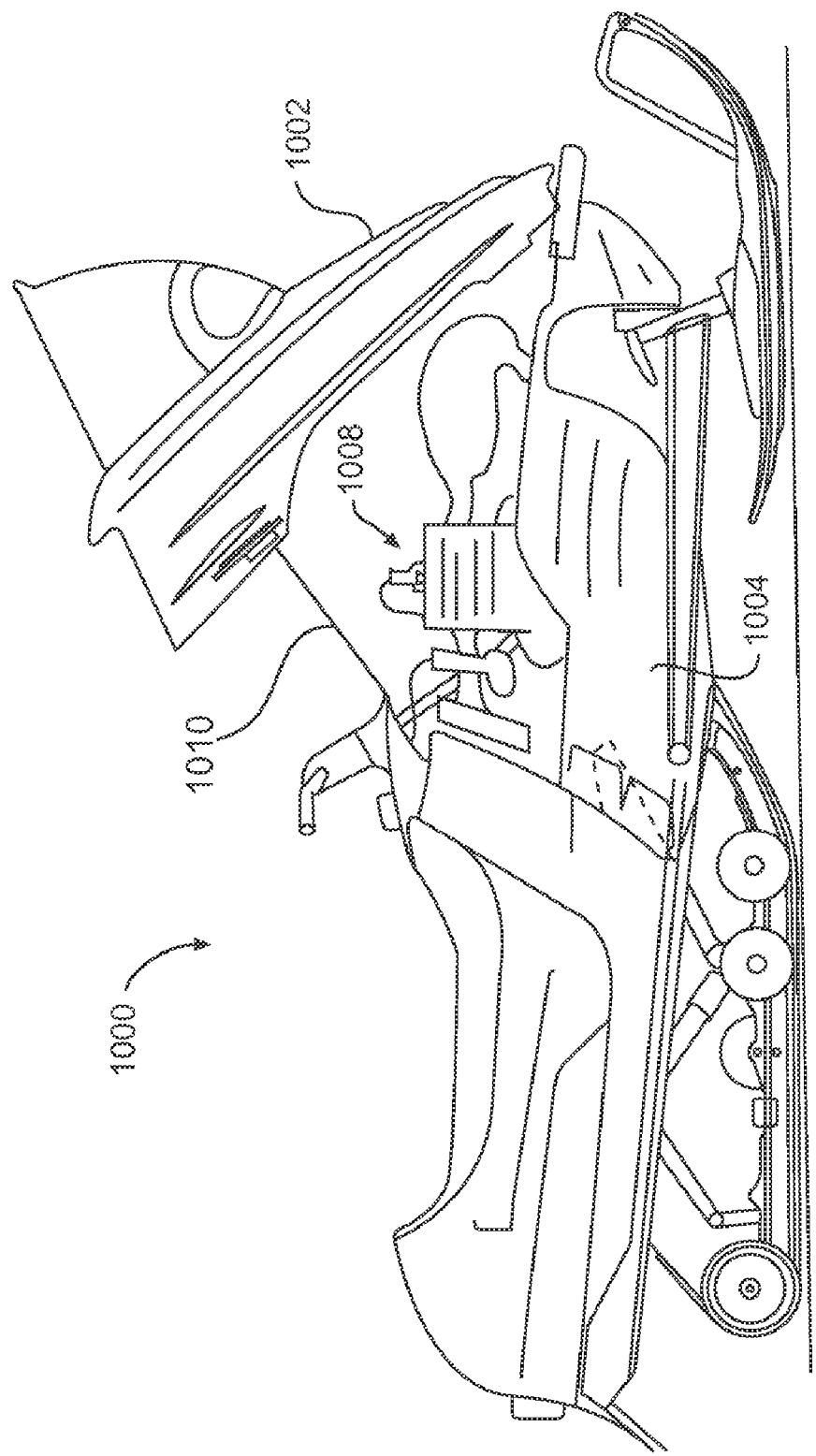
FIG. 2 is a side view of the snowmobile shown in FIG. 1, with the hood in a partially-open position.
Figure 3:
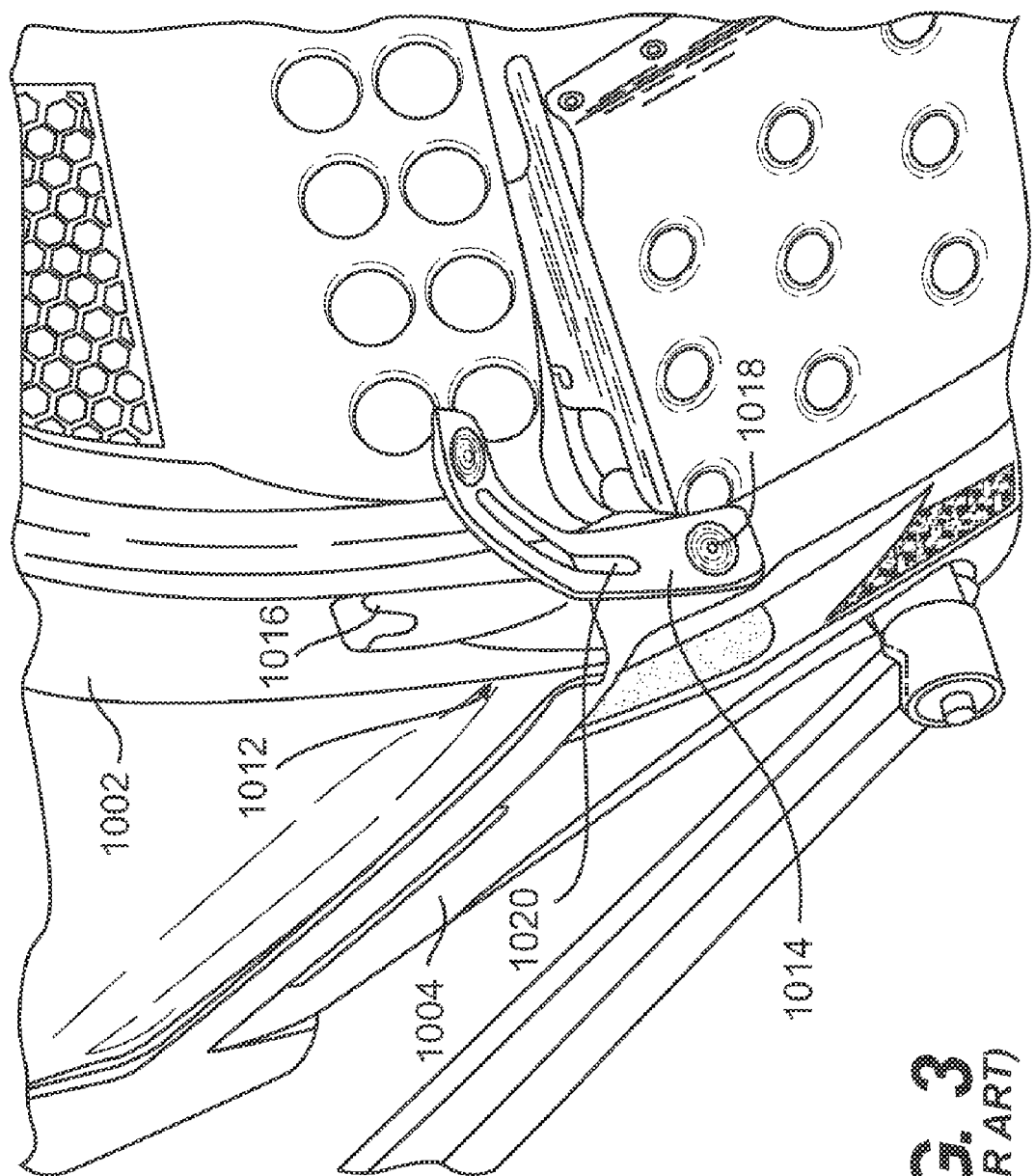
FIG. 3 is a partial rear perspective view of a snowmobile showing one embodiment of how a snowmobile hood is held closed in the prior art.

In the drawings, preferred embodiments of the invention are illustrated by way of example. It is to be expressly understood that the description and drawings are only for purposes of illustration and as an aid to understanding, and are not intended to be a definition of the limits of the invention.

DETAILED DESCRIPTION OF PREFERRED EMBODIMENTS

Figure 4:
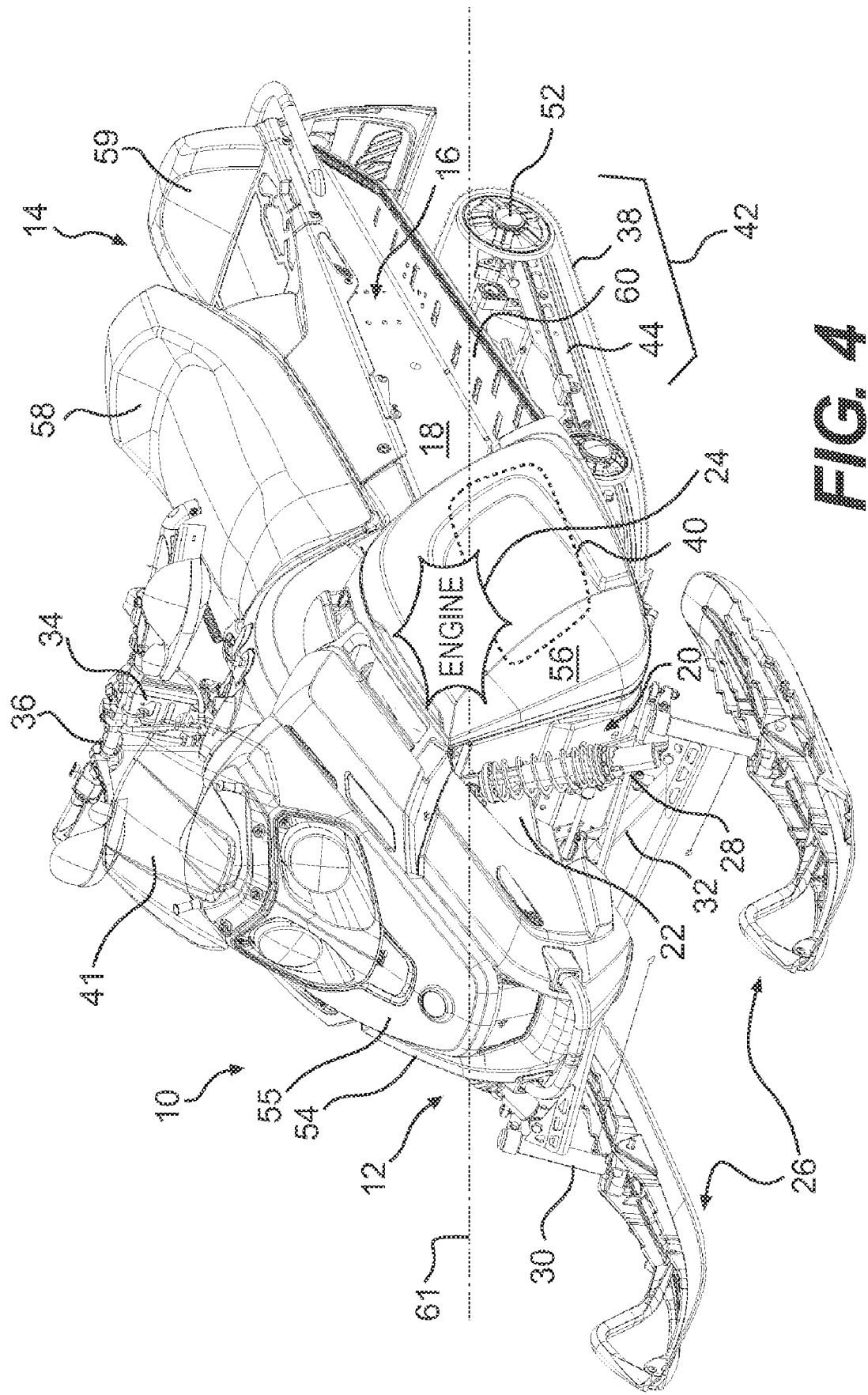
FIG. 4 is a perspective view of a snowmobile equipped with a hood attachment system of the present invention (among other features).

Referring now to FIG. 4, a snowmobile incorporating embodiments of the present invention is designated generally by reference numeral 10. This snowmobile is commercially available from Bombardier Recreational Products of Valcourt, Canada under the designation SKI-DOO™ FREESTYLE™. Although certain aspects of the present invention are applicable in other types of vehicles, the present invention has particular utility in connection with snowmobiles.

The snowmobile 10 includes a forward end 12 and a rearward end 14 which are defined consistently with a travel direction of the vehicle. The snowmobile 10 includes a frame or chassis 16 which normally includes a rear tunnel 18, an engine cradle portion 20 and a front suspension assembly portion 22. An engine 24, which is schematically illustrated in FIG. 4, is carried by the engine cradle portion 20 of the frame 16. A ski and steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 26, in order to steer the vehicle.

An endless drive track 38 is positioned at the rear end 14 of the snowmobile 10 and is disposed under tunnel 18, being connected operatively to the engine 24 through a belt transmission system 40 which is schematically illustrated by broken lines in FIG. 4. Thus, the endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes one or more shock absorbers (not shown) which may further include a coil spring (not shown) surrounding the individual shock absorbers. Front and rear suspension arms (not shown) are provided to attach the slide rails 44 to the frame 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood 55 and one or more side panels 56 which can be opened to allow access to the engine 24 and the belt transmission system 40 when this is required, for example, for inspection or maintenance of the engine 24 and/or the belt transmission system 40. In the particular snowmobile 10 shown in FIG. 4, the side panels can be opened along a vertical axis to swing away from the snowmobile 10. A windshield 41 is connected to the hood. The windshield 41 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an engine output shaft (not shown) that rotates about a horizontally/laterally disposed axis that extends generally transversely to a longitudinal centerline 61 extending in a front to rear direction of the snowmobile 10. The engine output shaft drives the belt transmission system 40 for transmitting torque to the endless drive track 38 for propulsion of the snowmobile 10.

A straddle seat 58 is positioned atop the tunnel 18 of the frame 16 and extends from the rear end 14 of the snowmobile 10 to the fairings 54. A rear portion 59 of the seat 58 may include a storage compartment or can be used to accommodate a passenger seat. Two footrests 60 are positioned on opposite sides of the snowmobile 10 below the seat 58 to accommodate the driver's feet.

Figure 5:
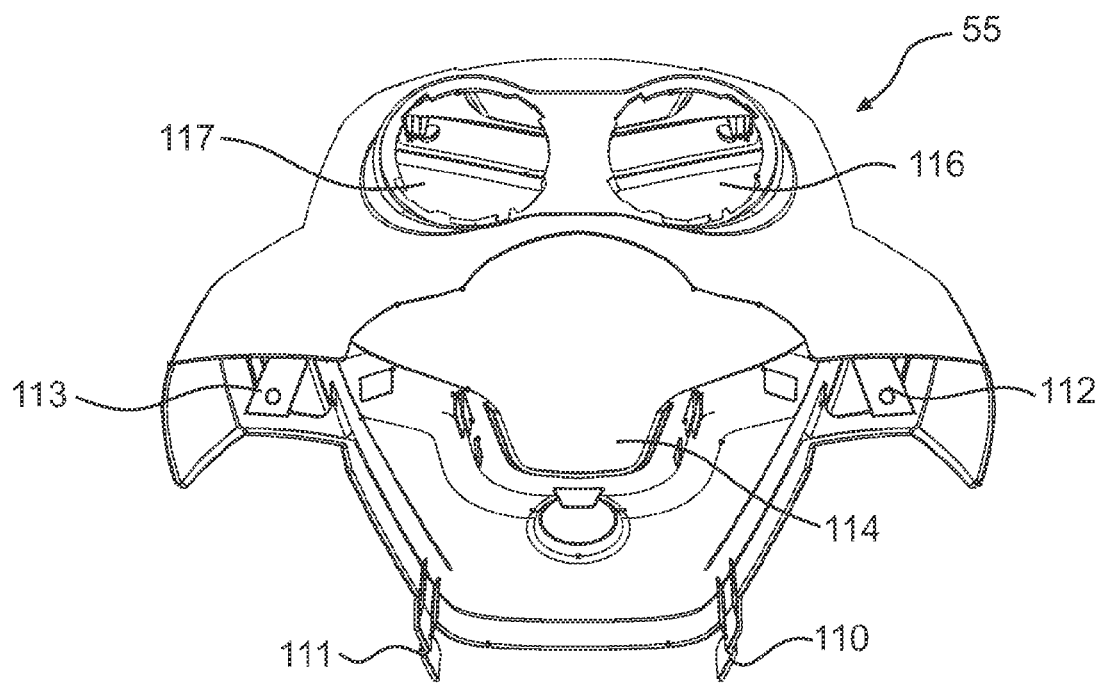
FIG. 5 is a rear perspective view of a hood according to one embodiment of the present invention.
Figure 6:
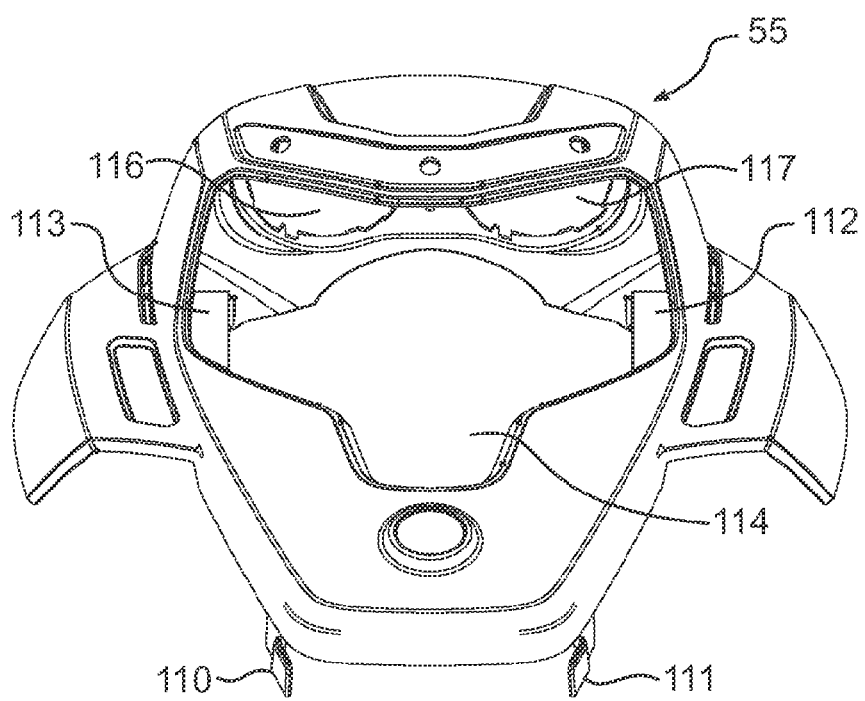
FIG. 6 is a front perspective view of the hood shown in FIG. 5.

FIGS. 5 and 6 show a rear and a front perspective view, respectively, of the removable hood 55 according to an embodiment of the present invention. The hood 55 includes two male connectors in the form elongated L-shaped fingers 110 and 111 attached to the underside of the front portion and two rubber elastic connectors 112 and 113 fixed to the underside of the rear portion. Although the rubber elastic connectors 112 and 113 are fixed to the hood 55, they can be removed and replaced in case of breakage. The hood 55 further comprises a central opening 114 in its front face to accommodate a headlight structure and two openings 116 and 117 in its rear face to accommodate two analog or digital displays. FIG. 4. shows that the hood 55 also includes a windshield 41.

Figure 7:
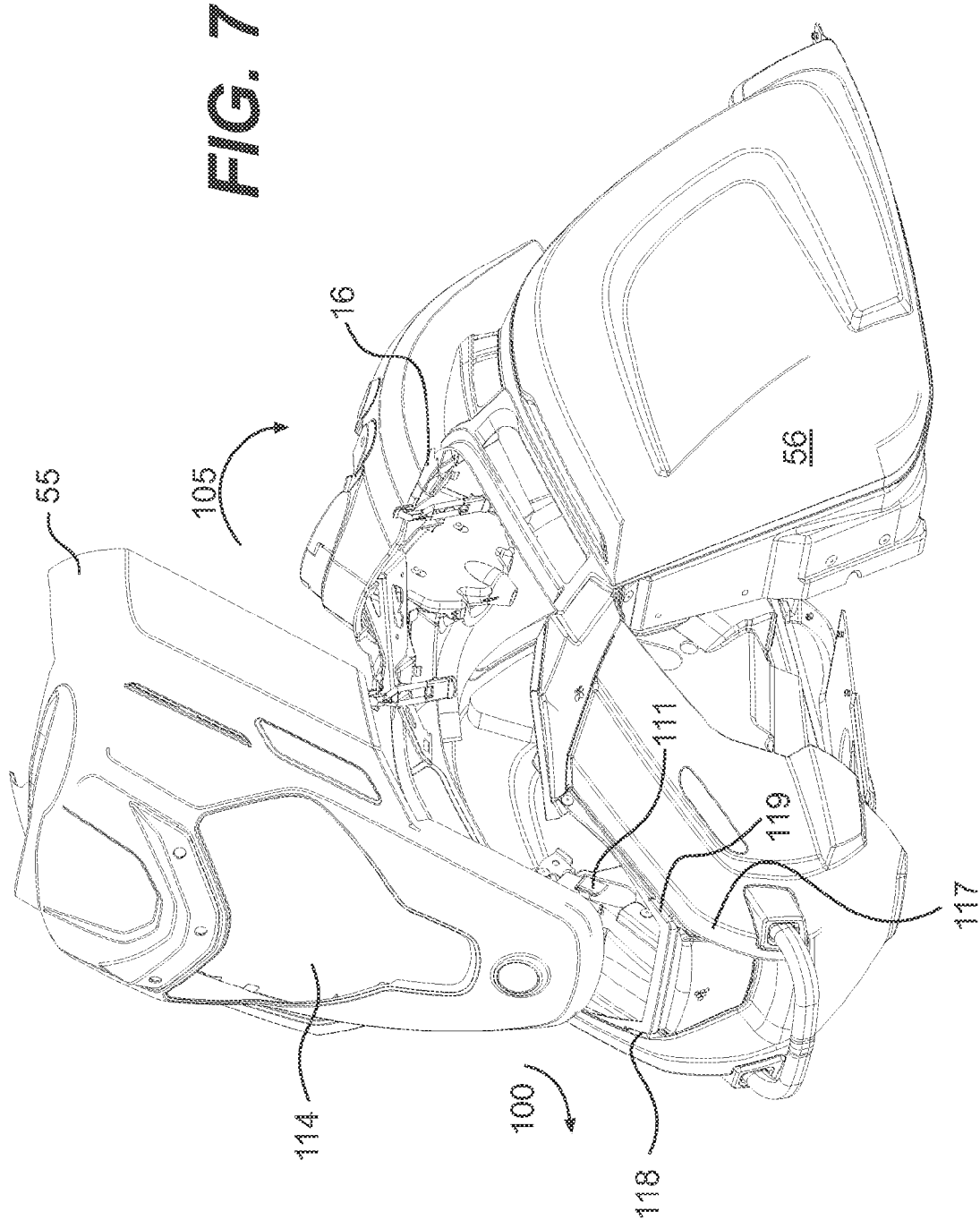
FIG. 7 is a partial front perspective view of the hood shown in FIGS. 5 and 6, in a tilted position for installation on the snowmobile.
Figure 8:
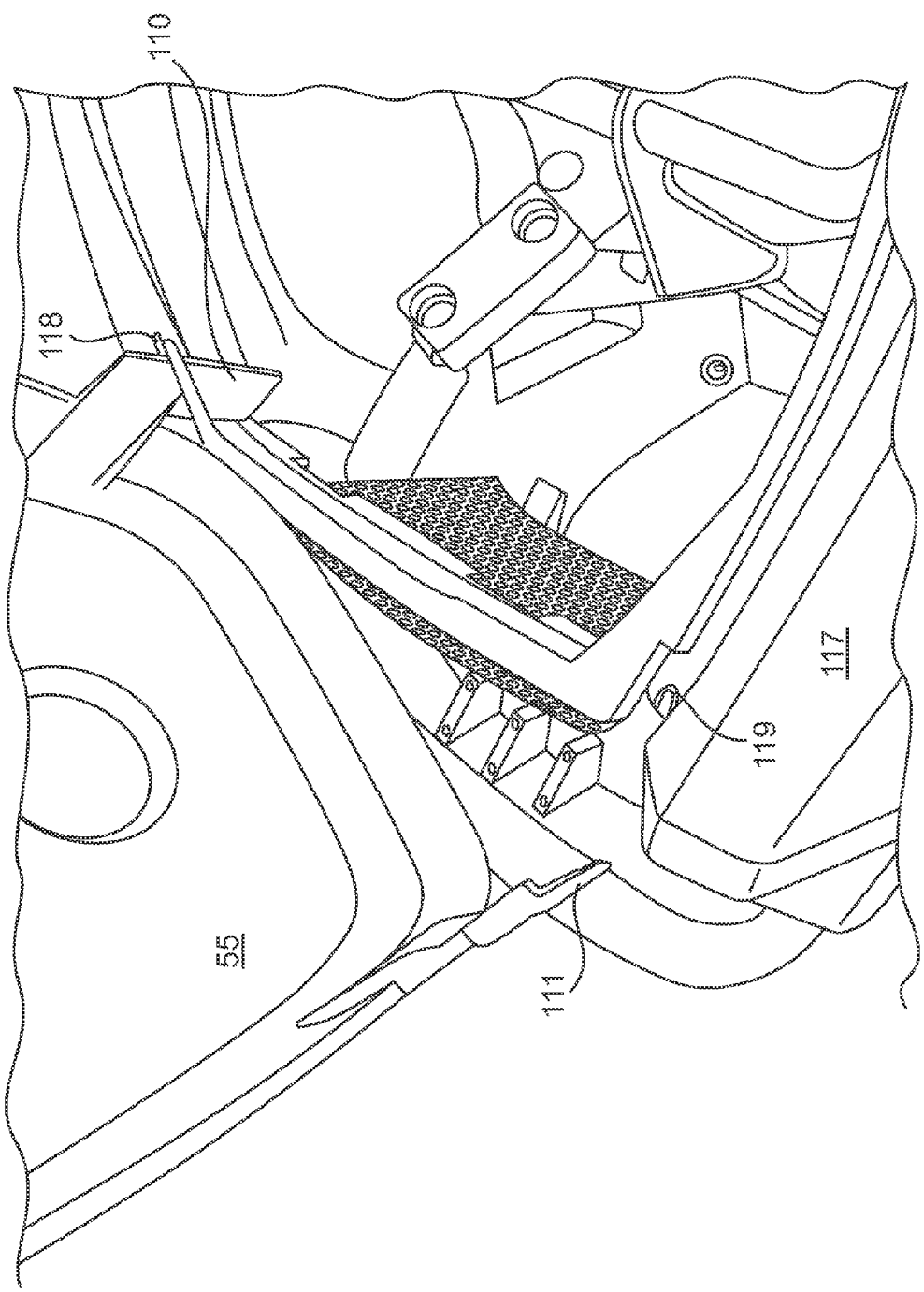
FIG. 8 is a partial rear perspective view of a snowmobile of the present invention showing how the front of the snowmobile hood couples with the snowmobile in one embodiment of the present invention.
Figure 9:
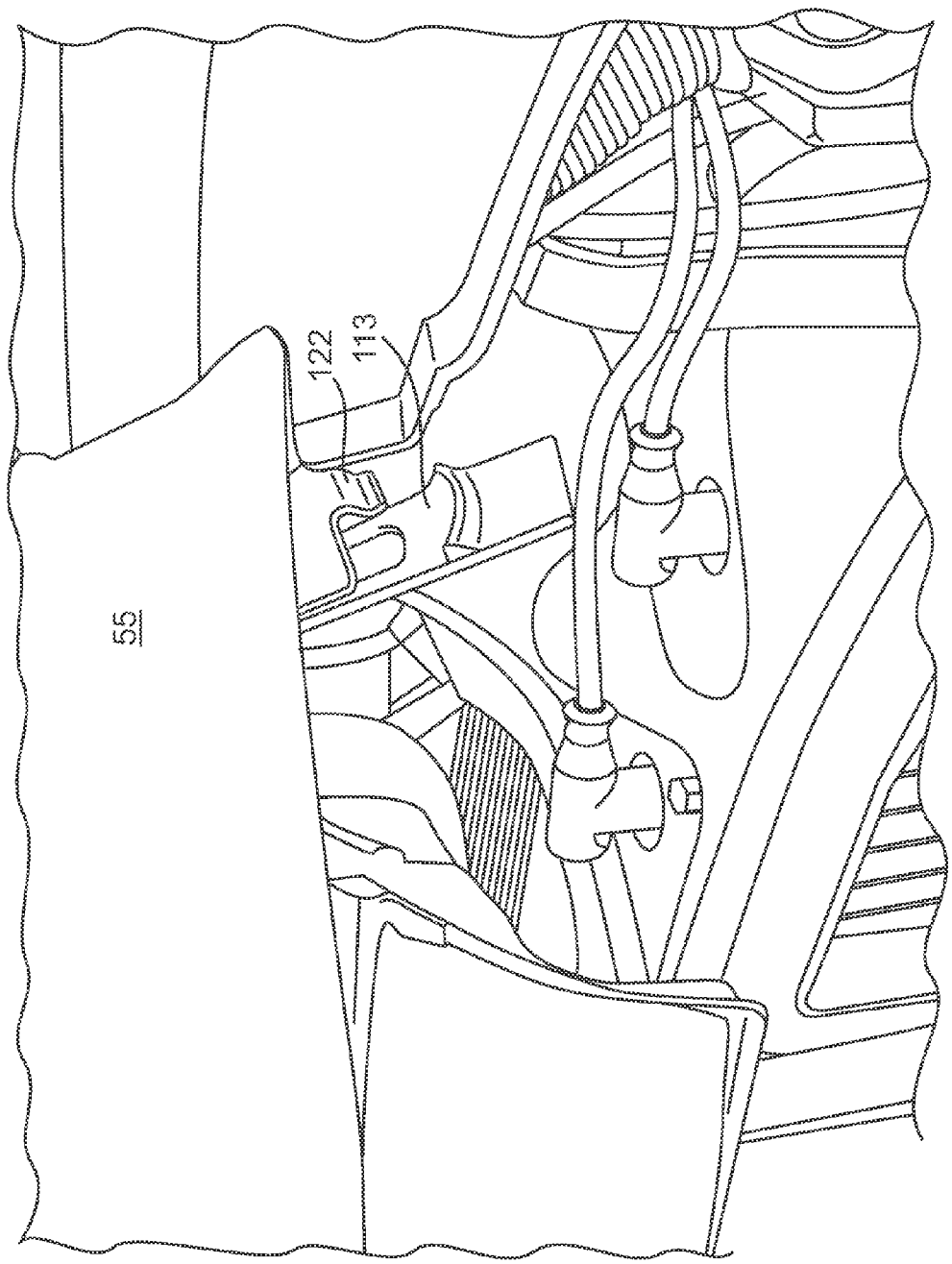
FIG. 9 is a partial rear perspective view of the snowmobile showing how the rear of the snowmobile hood attaches to the snowmobile in one embodiment of the present invention.

To install the hood 55 on the snowmobile 10, the rear portion of the hood 55 is tilted slightly towards the front 12 of the snowmobile 10 and the front portion of the hood is tilted slightly downward towards the ground. This position of the hood 55 is depicted in the partial perspective view of the snowmobile 10 in FIG. 7. The hood 55 is then moved forward and downward and rotated in direction 100 until the elongated fingers 110 and 111 engage with corresponding female connectors, slots 118 and 119 in the front fairing 117 to hold the front portion of the hood 55 in place. FIG. 8 shows finger 110 in an engaged position with slot 118, and finger 111 not yet in an engaged position with slot 119. Once finger 111 is in the engaged position with slot 119, the rear portion of the hood can then be lowered in direction 105 shown in FIG. 7 until fitted appropriately on the vehicle. The elastic members 112 and 113 are then engaged with hooks 120 (not shown) and 122 by stretching and positioning them such that the openings therein engage the hooks 120 and 122 on the frame 16 thus discouraging the hood 55 from moving relative to the frame 16. FIG. 9 shows the elastic member 113 in the process of being engaged with the hook 122.

To remove the hood 55 from the frame 16 of the snowmobile 10, the elastic members 112 and 113 are first disengaged from hooks 120 and 122, again by stretching. The rear portion of the hood 55 is then lifted in a direction opposite to direction 105 in FIG. 7. The hood 55 is then slid in a direction opposite to direction 100 until fingers 110 and 111 are disengaged from slots 118 and 119 thus freeing the hood from the snowmobile 10.

Figure 10:
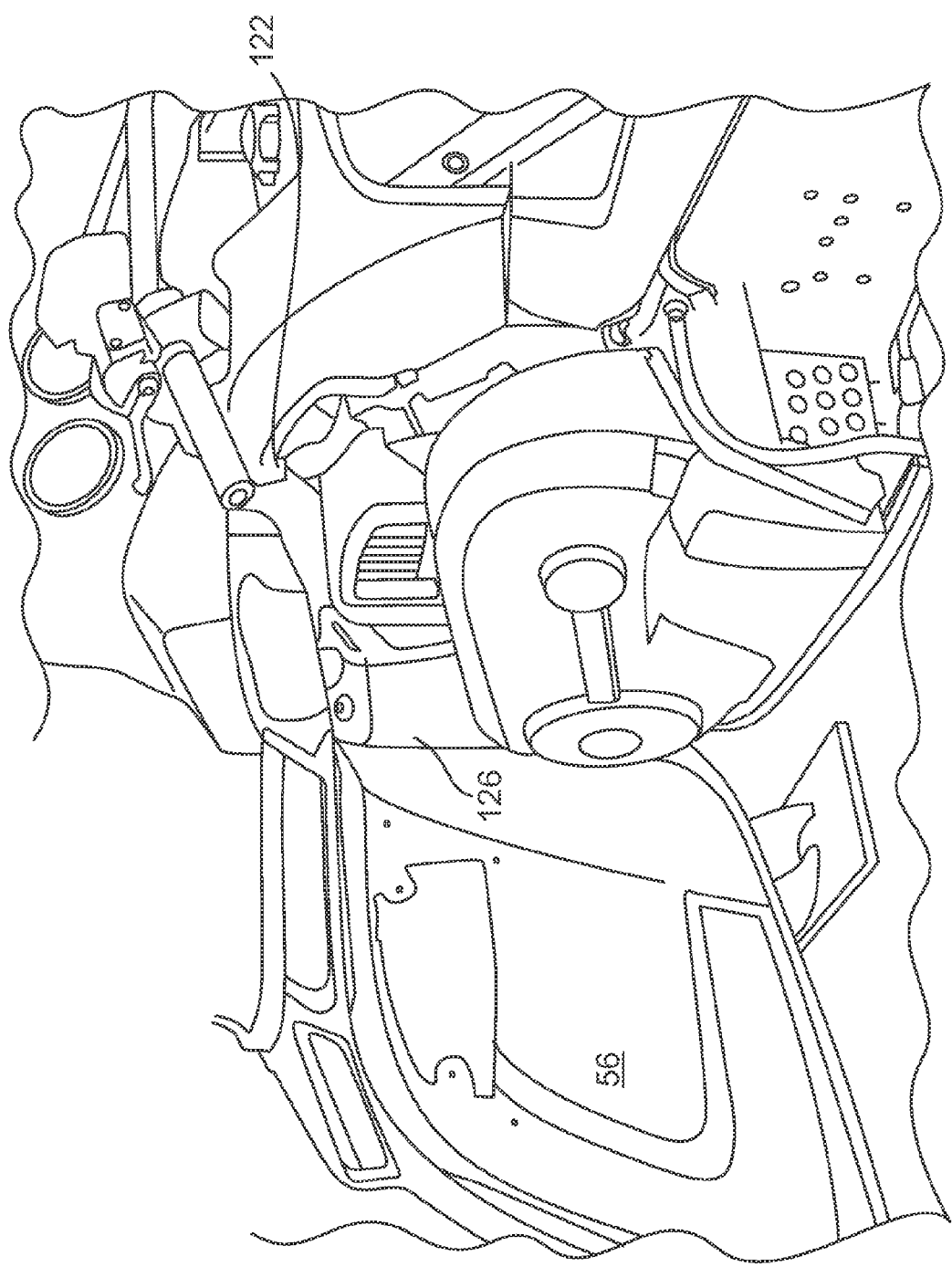
FIG. 10 is a partial rear perspective view of the snowmobile showing one of the side panels swung open to allow access to the point at which the rear of the snowmobile hood is attached to the snowmobile.
Figure 11:
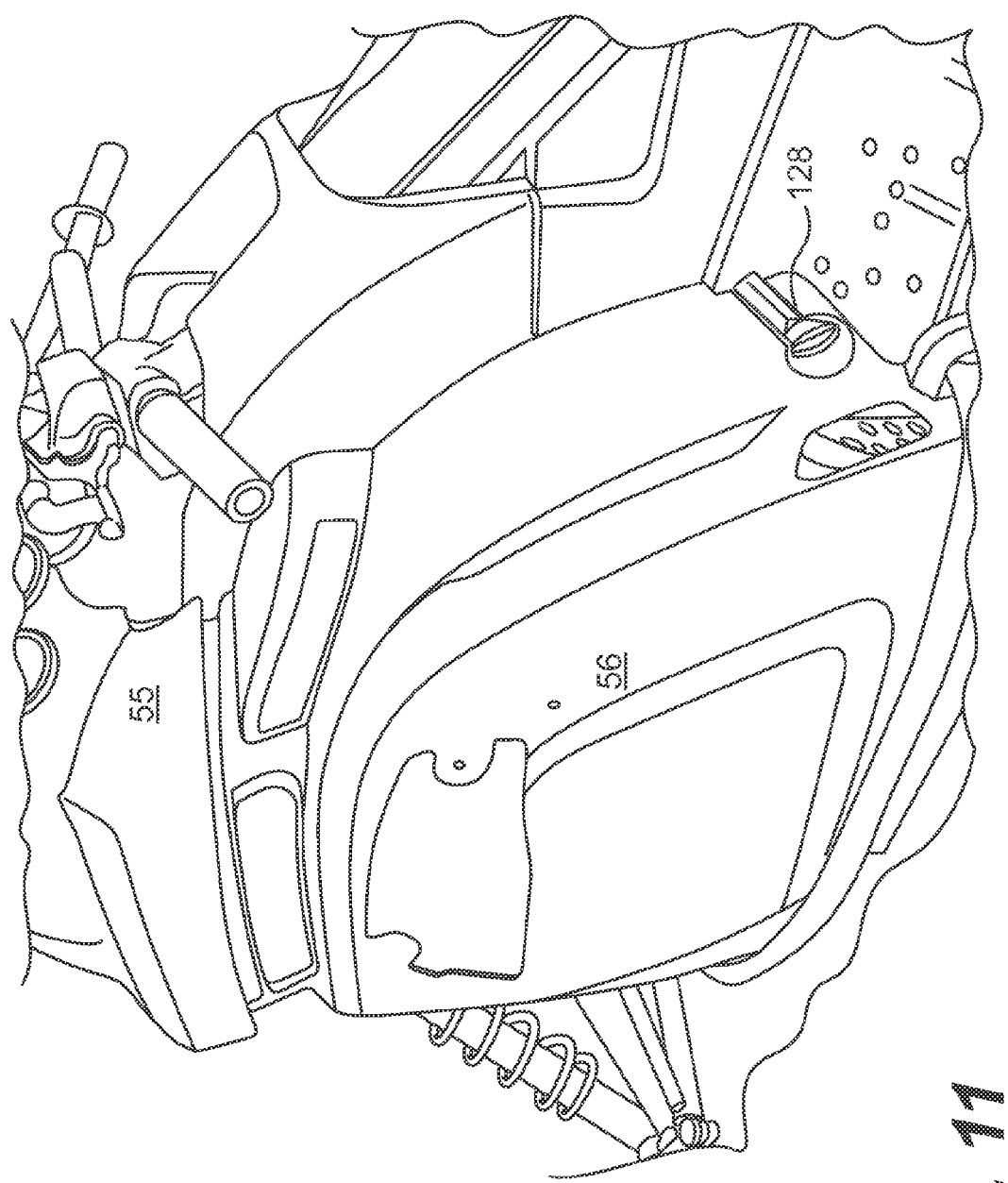
FIG. 11 is a partial rear perspective view of the snowmobile showing one of the side panels in the closed position in one embodiment of the present invention.

According to another embodiment, a side panel 56, which opens about a generally vertical axis at the front of the snowmobile 10 conceals the elastic members 112 and 113 and the hooks 120 and 122 from view (and covers them) when the side panel 56 is in the closed position. FIG. 11 shows the side panel 56 in the closed position. FIG. 10 shows the side panel 56 in the open position. The side panel 56 pivots about a hinge 126 and swings towards the front 12 of the snowmobile 10 to open. A latch means 128 shown in FIG. 11 secures the side panel to the frame 16 when the side panel 56 is in the closed position as is depicted in FIG. 11.

Figure 12:
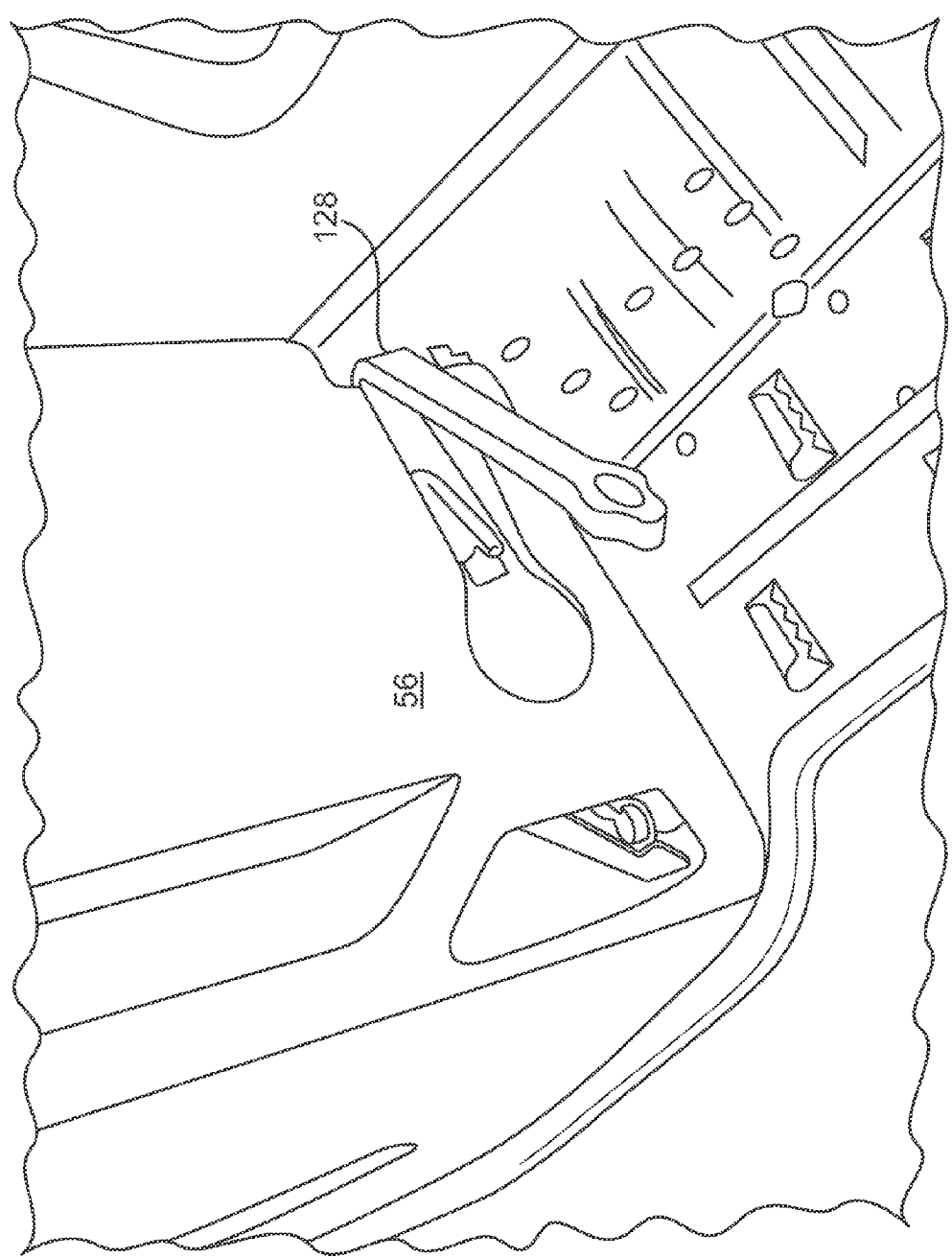
FIG. 12 is a partial rear perspective view of the latch maintaining one of the side panels in the closed position being disengaged to allow the side panel to be opened.
Figure 1:
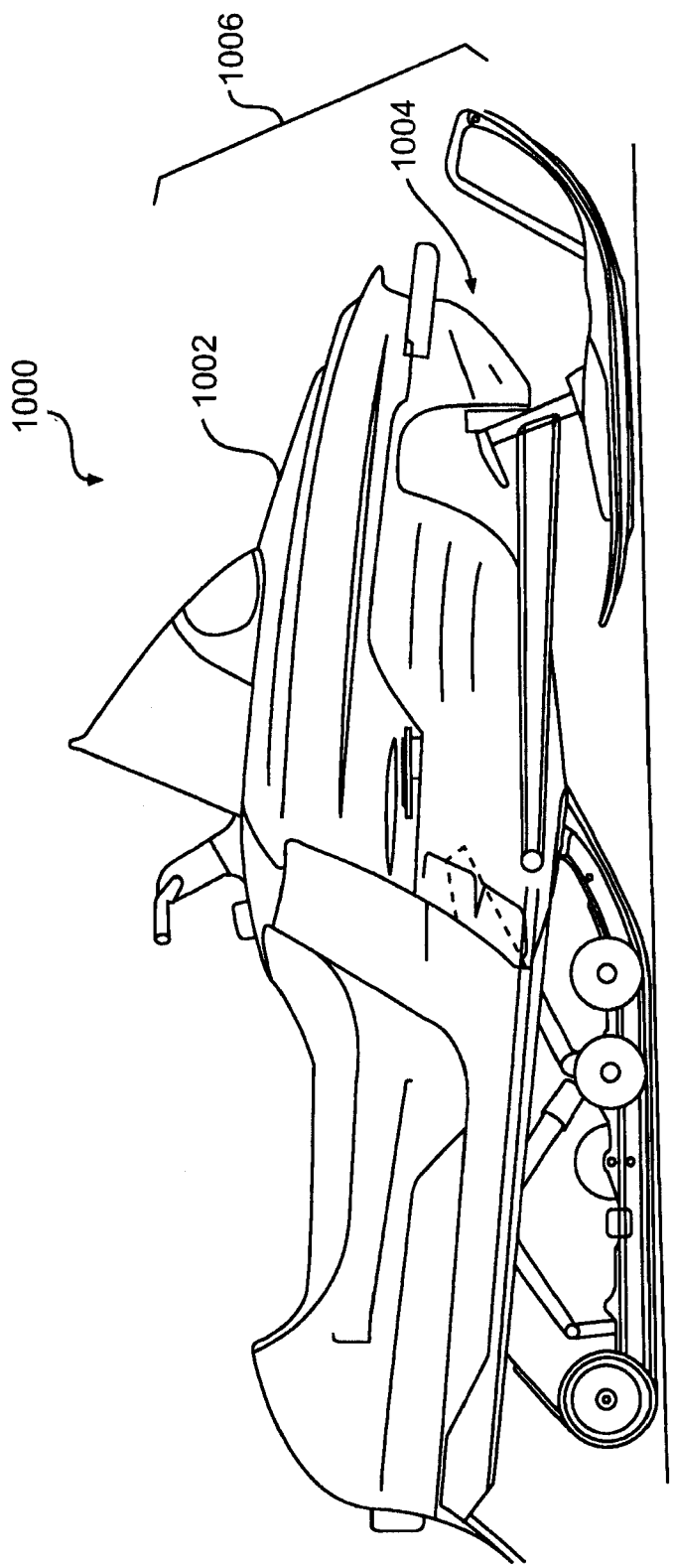
Figure 2:
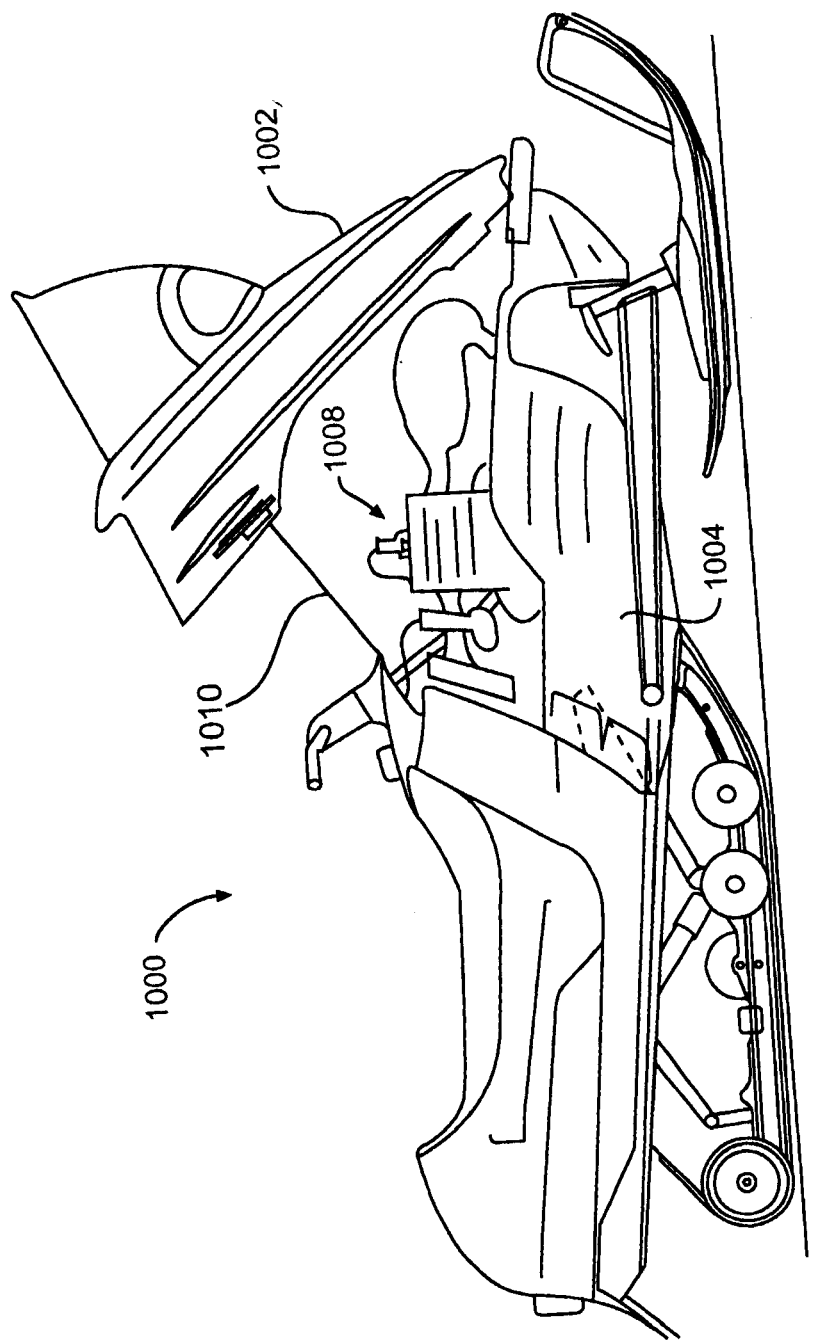
Figure 3:
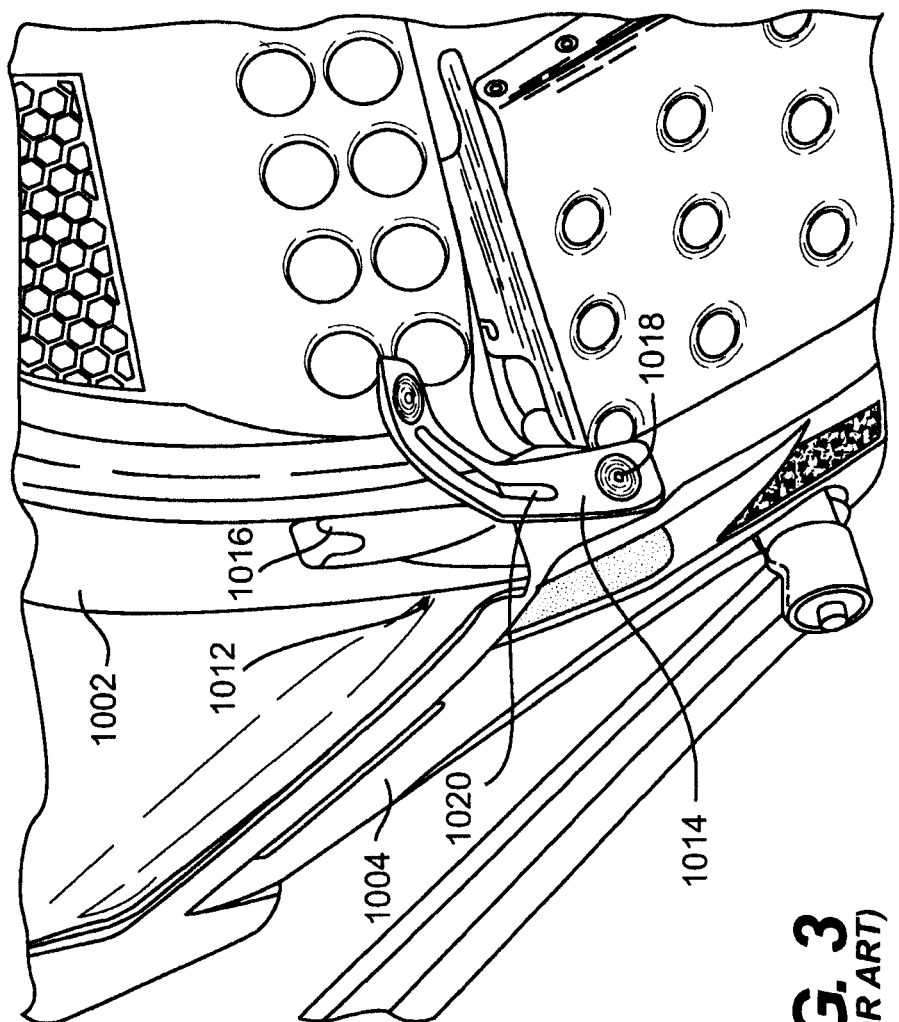
Figure 4:
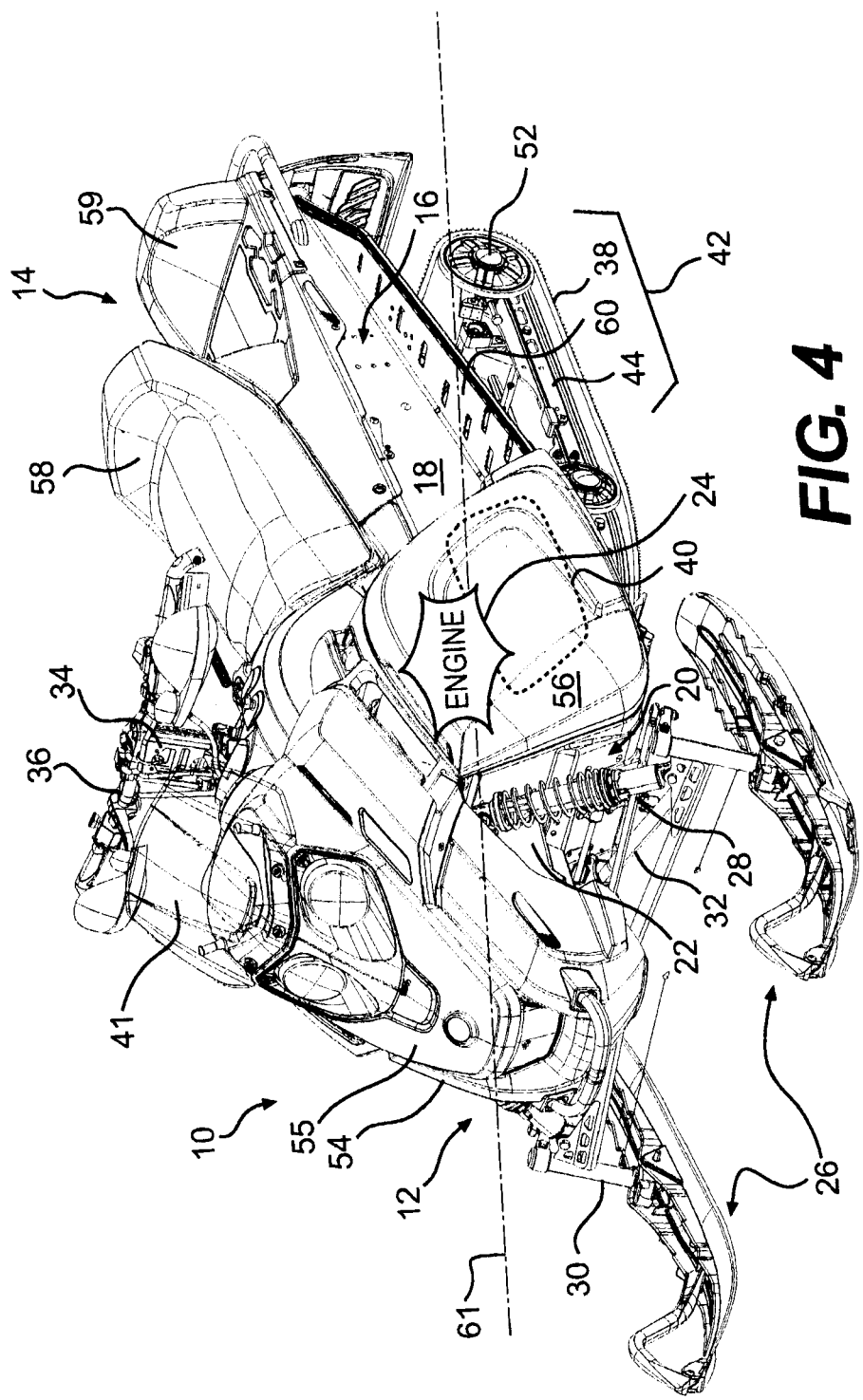
Figure 5:
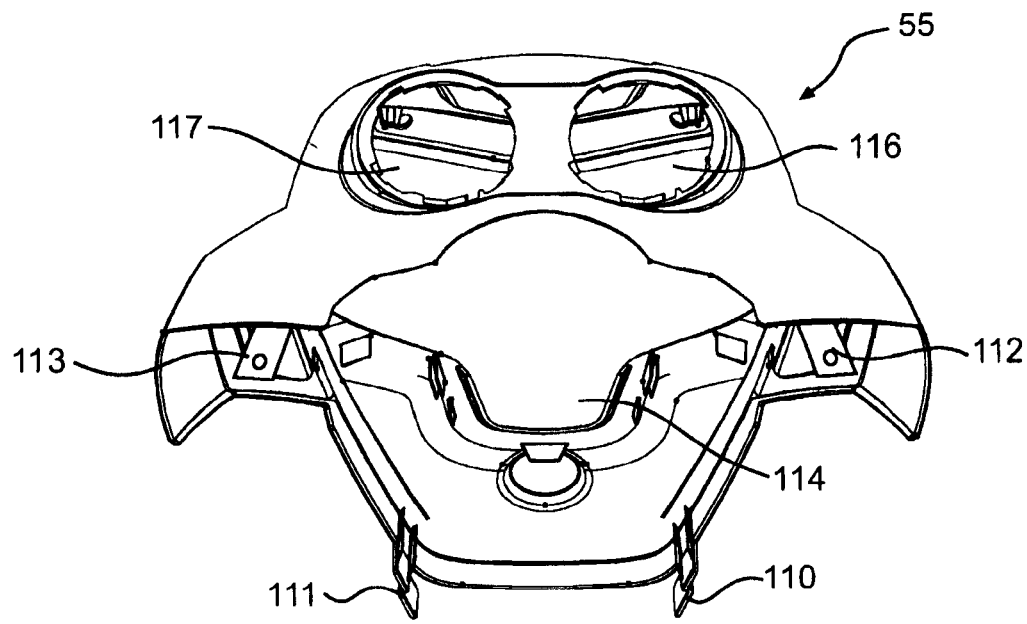
Figure 6:
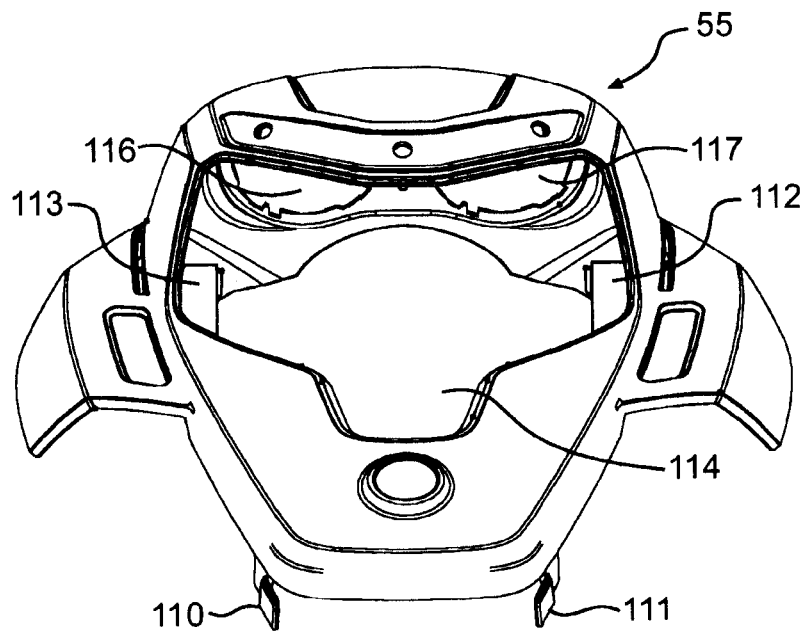
Figure 7:
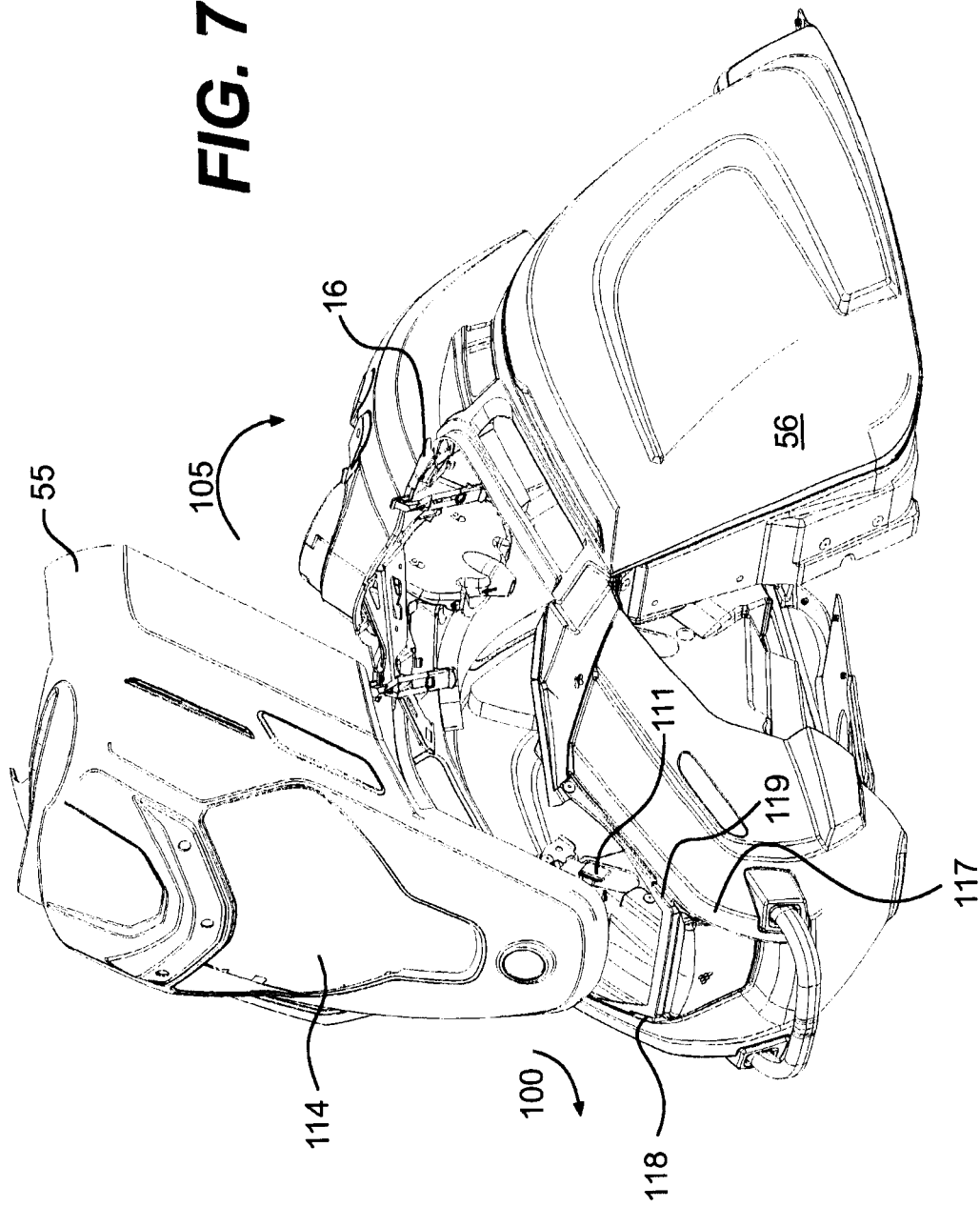
Figure 8:
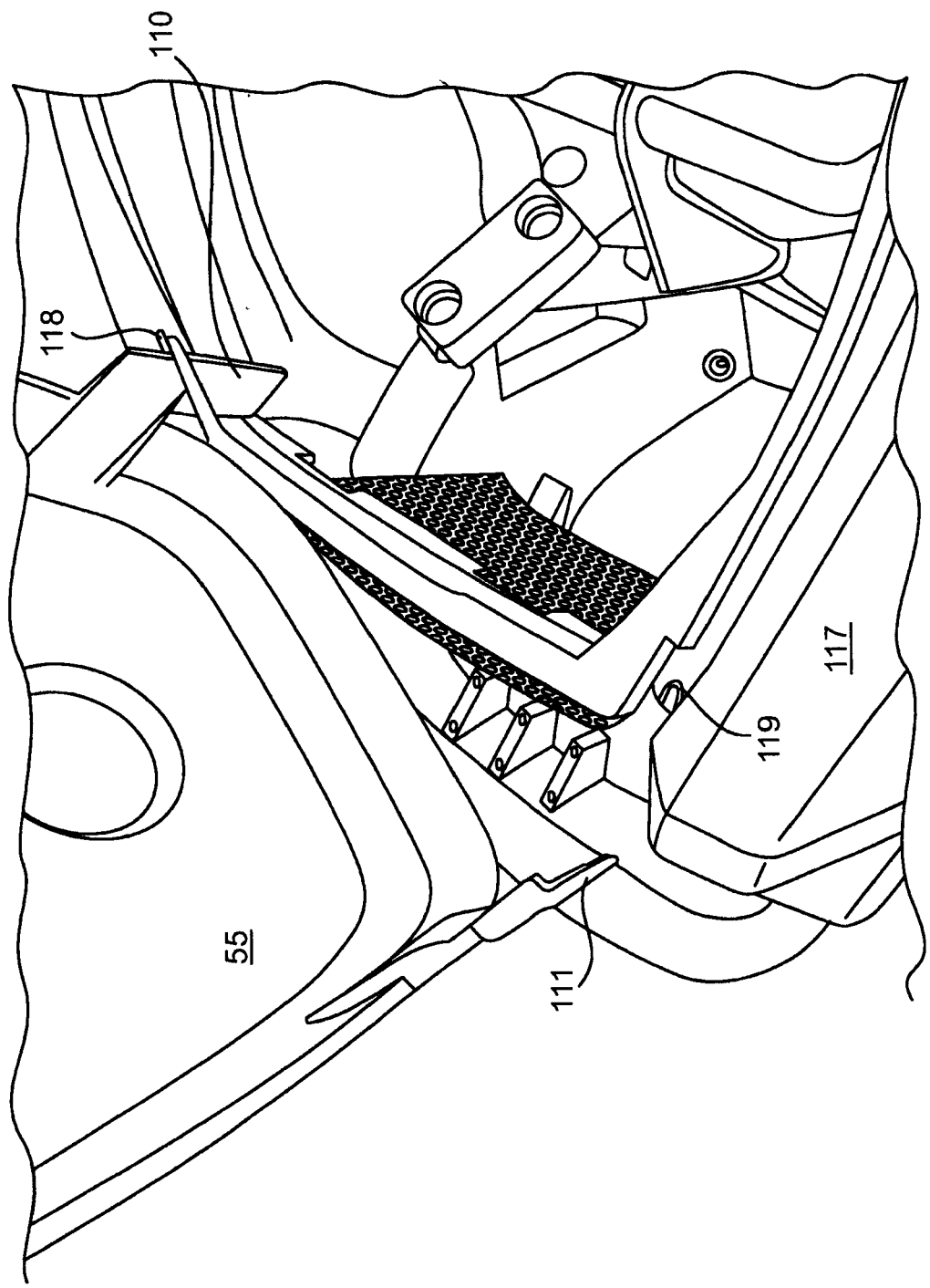
Figure 10:
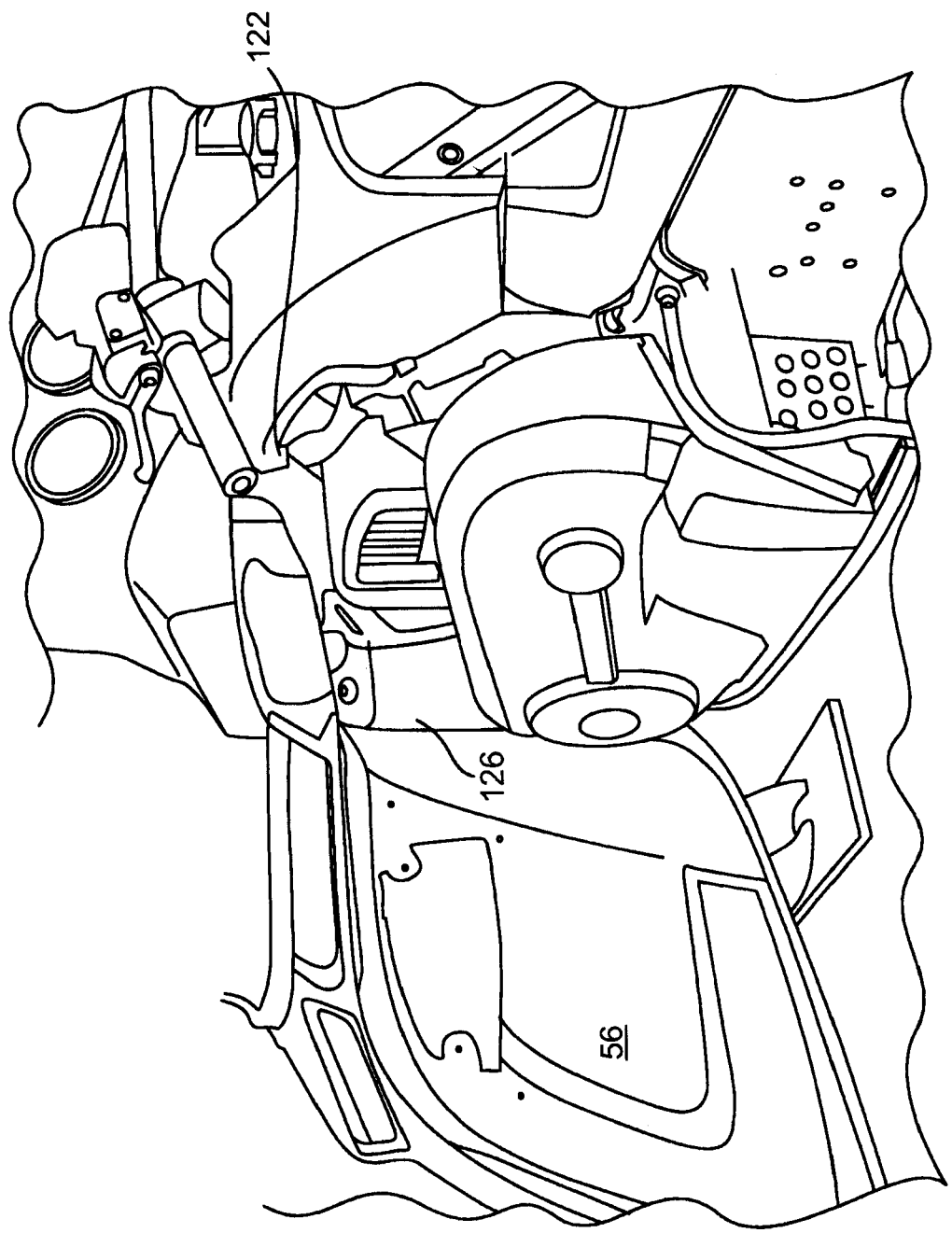
Figure 11:
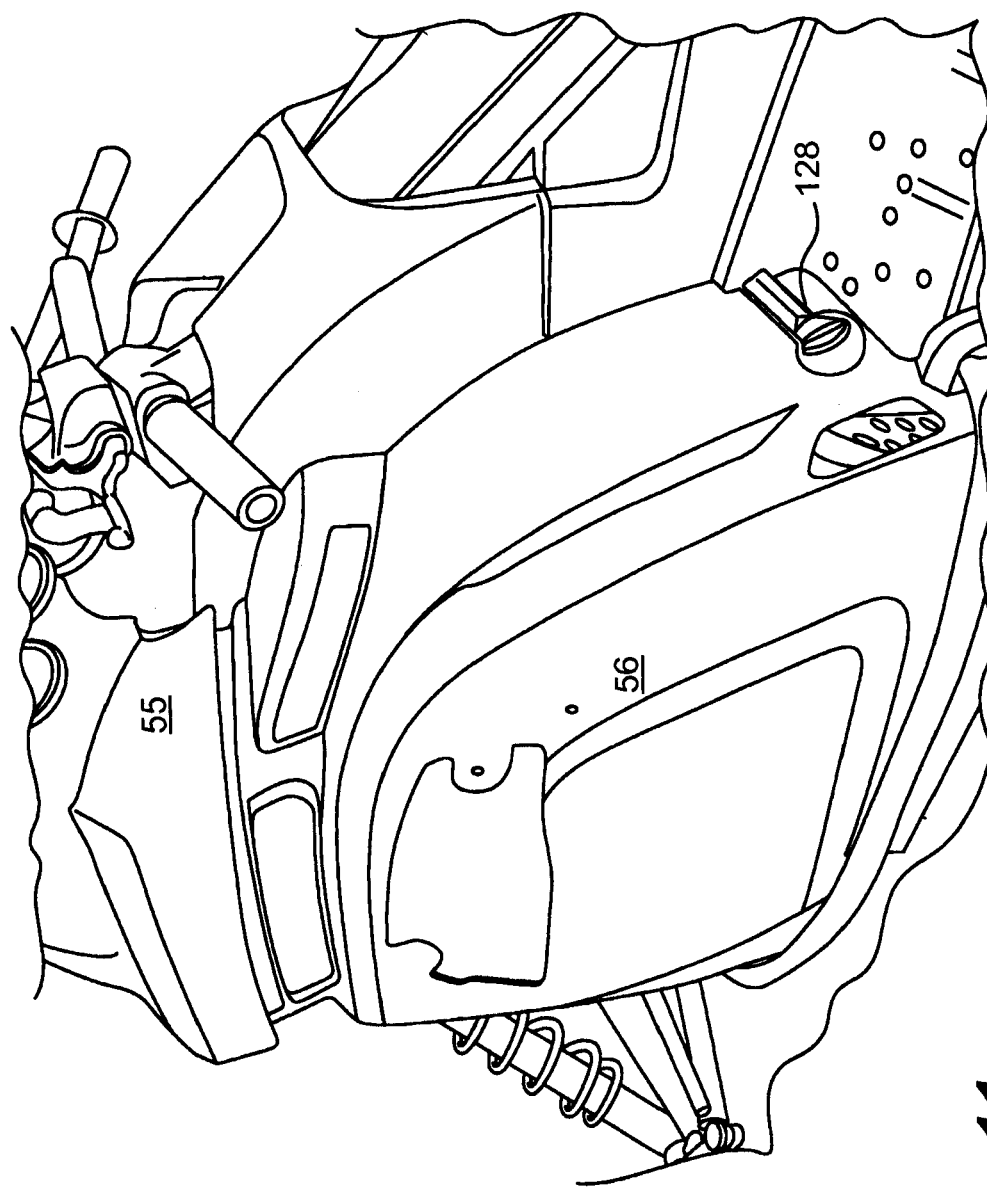
Figure 12:
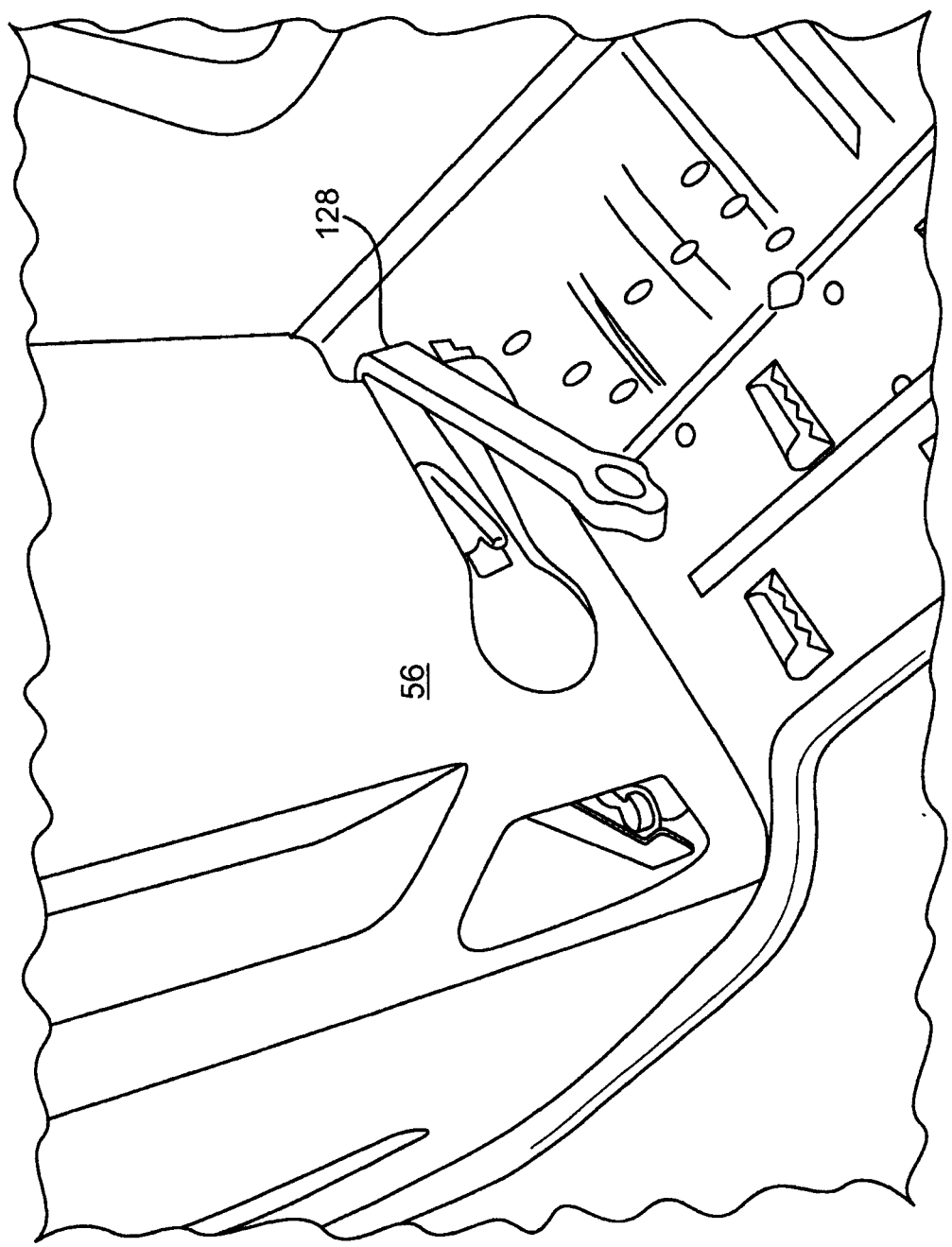

Before the hood 55 can be removed, the side panel 56 must be opened. FIG. 12 shows how the latch means 128 is disengaged from the side panel 56 to allow the side panel 56 to swing into the open position. When the side panel 56 is in the open position, the rubber elastic members 112 and 113 are accessible to the user and can be disengaged from the hooks 120 and 122 to allow the hood 55 to be removed.

In another preferred embodiment, the design of the hood 55 and side panel 56 include multi-dimensional planes which enhance the aerodynamic utility and the aesthetic appeal of the snowmobile 10.

In an alternative embodiment (not shown), two elongated fingers are attached to the front of the frame 16 or front fairing 117. These fingers engage with corresponding slots in the removable hood 55 in an interlocking male-female arrangement.

The above description of preferred embodiments should not be interpreted in a limiting manner since other variations, modifications and refinements are possible within the spirit and cope of the present invention. The scope of the invention is defined in the appending claims and their equivalents.

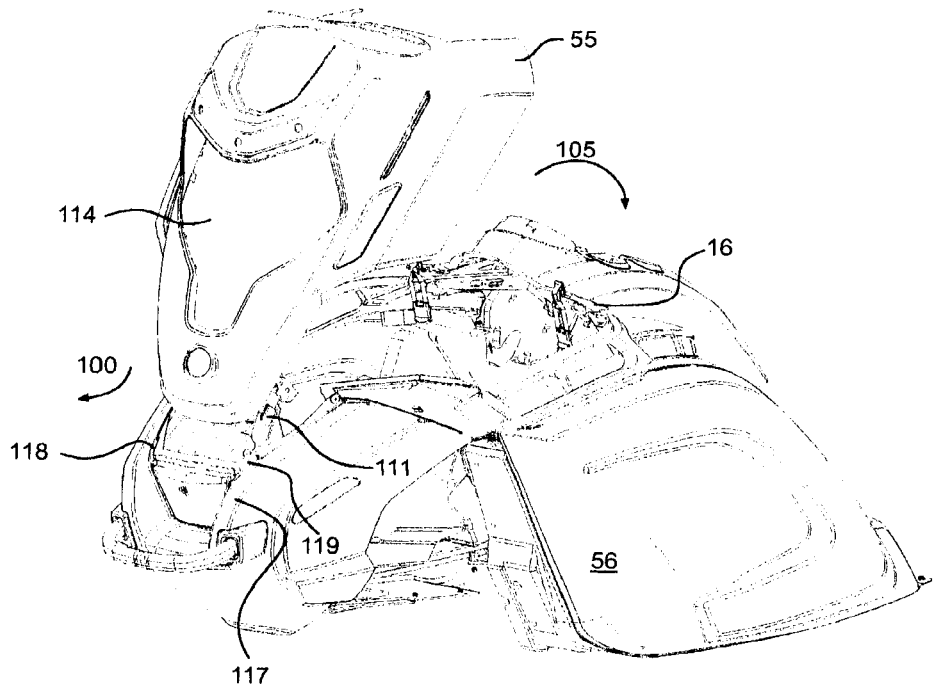

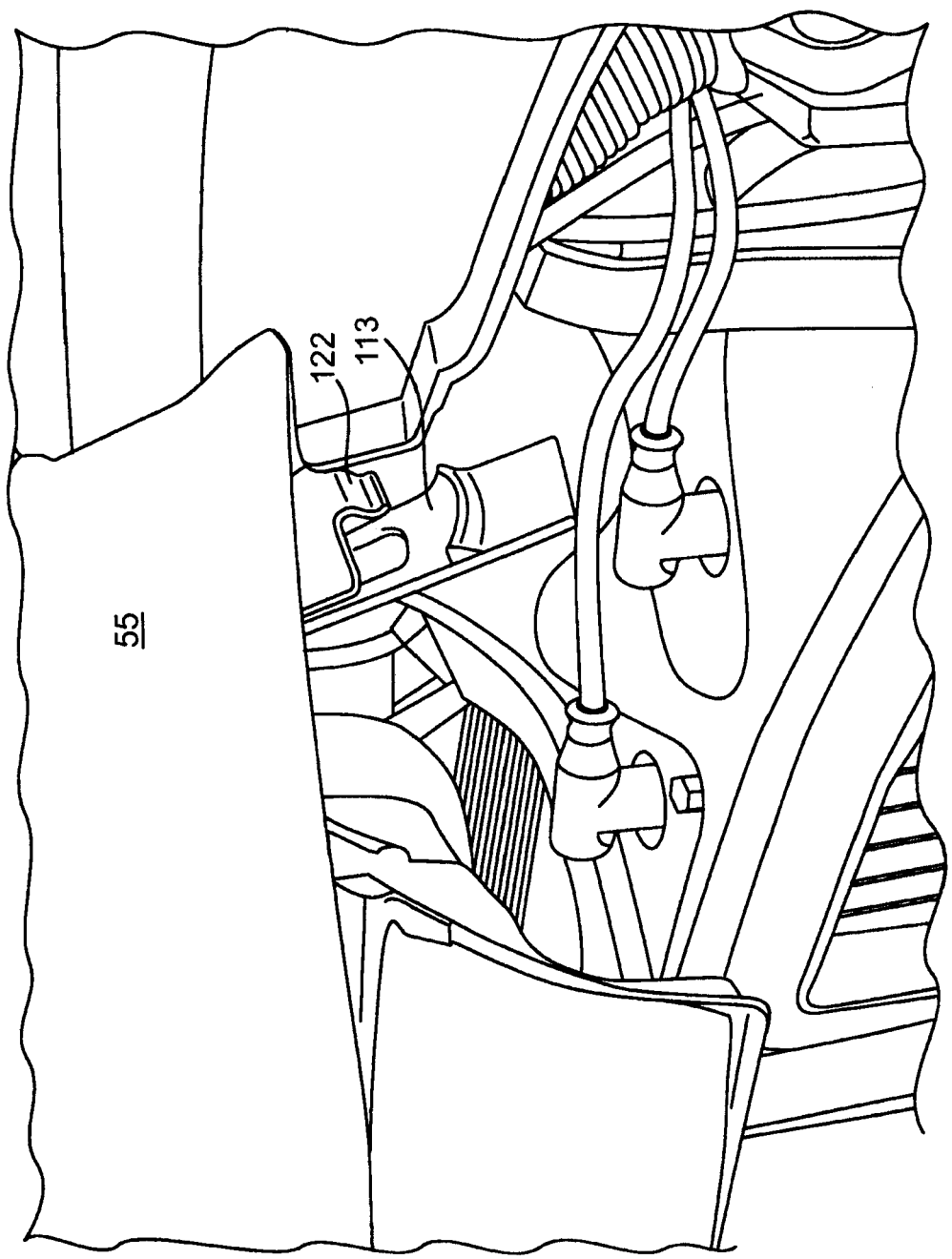

What is claimed is:

1. A snowmobile, comprising:
   a frame including a tunnel;
   an engine supported by the frame;
   an endless drive track below the tunnel and supported by the frame, the endless drive track being operatively connected to the engine to propel the snowmobile;
   a straddle seat above the tunnel and supported by the frame;
   two steering skis forward of the tunnel and supported by the frame;
   handlebars disposed on the frame forward of the seat, the handlebars being operatively connected to the skis to steer the snowmobile; and
   fairings supported by the frame, the fairings including a hood, the hood having a forward end and a rearward end, the hood being releasably secured to the snowmobile at least via interlocking male-female connectors,
   the interlocking male-female connectors including connectors disposed on the hood and corresponding connectors disposed on the snowmobile, the connectors disposed on the hood being one of male connectors and female connectors, the corresponding connectors disposed on the snowmobile being a remaining one of male connectors and female connectors, the male connectors being shaped such that securing the hood to the snowmobile through insertion of the male connectors into the female connectors requires movement of the hood in more than one direction, the connectors disposed on the hood being located closer to the forward end of the hood than to the rearward end of the hood,
   the hood being further releasably secured to the snowmobile via a hook and an elastic connector having an opening therein for receiving the hook,
   the fairings further including a section movable between an open position and a closed position, the fairings being constructed and arranged on the snowmobile such that in the closed position, the section conceals the hook and the elastic connector from view, and
   the hood being manually releasable from the snowmobile without the use of tools.

2. The snowmobile of claim 1, wherein the connectors disposed on the hood are male connectors and the corresponding connectors disposed on the snowmobile are female connectors.

3. The snowmobile of claim 1, wherein the male connectors are L-shaped.

4. The snowmobile of claim 1, wherein:
one of the hook and the elastic connector is disposed on the snowmobile;
the other of the hook and the elastic connector is disposed on the hood; and
the other of the hook and the elastic connector is disposed closer to the rearward end of the hood than to the forward end of the hood.

5. The snowmobile of claim 1, wherein the fairings are constructed and arranged on the snowmobile such that in the closed position, the section covers the hook and the elastic connector.

6. A hood suitable for use on a snowmobile having:
a frame including a tunnel;
an engine supported by the frame;
fairings supported by the frame, the fairings including a section movable between an open position and a closed position;
an endless drive track below the tunnel and supported by the frame, the endless drive track being operatively connected to the engine to propel the snowmobile;
a straddle seat above the tunnel and supported by the frame;
two steering skis forward of the tunnel and supported by the frame;
handlebars disposed on the frame forward of the seat, the handlebars being operatively connected to the skis to steer the snowmobile; and
a system for releasably securing the hood to the snowmobile without the use of tools, the system including portions of male-female connectors disposed on the snowmobile and at least one of a hook and a corresponding elastic connector with an opening;
the hood comprising:
a body;
a forward end and a rearward end;
portions of male-female connectors disposed on the body and configured to mate with the portions of male-female connectors disposed on the snowmobile, the portions of the male-female connectors disposed on the body being located closer to the forward end of the hood than to the rearward end of the hood; and
at least the other of the hook and the corresponding elastic connector disposed on the body, the fairings being constructed and arranged on the snowmobile such that in the closed position, the section covers the hook and the elastic connector.

7. The hood of claim 6, wherein the portions of the male-female connectors disposed on the hood are male and the portions of the male-female connectors disposed on the snowmobile are female.

8. The hood of claim 7, wherein the male connectors are shaped such that securing the hood to the snowmobile through insertion of the male connectors into the female connectors requires movement of the hood in more than one direction.

9. The hood of claim 8, wherein the male connectors are L-shaped.

10. The hood of claim 6, wherein the other of the hook and the corresponding elastic connector disposed on the body is disposed closer to the rearward end of the hood than to the forward end of the hood.

11. The hood of claim 6, wherein the fairings are constructed and arranged on the snowmobile such that in the closed position, the section conceals the hook and the elastic connector from view.

12. A method of releasably securing, without the use of tools, a hood on a snowmobile, the snowmobile having,
a frame including a tunnel;
an engine supported by the frame;
fairings supported by the frame, the fairings including a section movable between an open position and a closed position;
an endless drive track below the tunnel and supported by the frame, the endless drive track being operatively connected to the engine to propel the snowmobile;
a straddle seat above the tunnel and supported by the frame;
two steering skis forward of the tunnel and supported by the frame;
handlebars disposed on the frame forward of the seat, the handlebars being operatively connected to the skis to steer the snowmobile;
a system for releasably securing the hood to the snowmobile without the use of tools, the system including portions of male-female connectors disposed on the snowmobile and at least one of a hook and a corresponding elastic connector;
the hood having,
a body;
portions of male-female connectors disposed on the body and configured to mate with the portions of male-female connectors disposed on the snowmobile; and
at least the other of the hook and the corresponding elastic connector disposed on the body, the fairings being constructed and arranged on the snowmobile such that in the closed position, the section conceals the hook and the elastic connector from view;
the method comprising:
(i) interlocking the portions of the male-female connectors disposed on the hood with the portions of the male-female connectors disposed on the snowmobile through movement of the hood;
(ii) stretching one of the elastic connectors;
(iii) passing the stretched elastic connector over its corresponding hook;
(iv) releasing the stretched elastic connector;
(v) if there is more than one elastic connector, repeating steps (ii) to (iv) for each of the elastic connectors of the system;
(vi) prior to releasably securing the hood on the snowmobile, moving the section of the fairing to the open position; and
(vii) after releasably securing the hood on the snowmobile, moving the section of the fairing to the closed position.

* * * * *

UNITED STATES PATENT AND TRADEMARK OFFICE
CERTIFICATE OF CORRECTION

PATENT NO.        : 7,802,644 B2                                                    Page 1 of 13
APPLICATION NO. : 11/563003
DATED             : September 28, 2010
INVENTOR(S)       : Jacques Brodeur et al.

It is certified that error appears in the above-identified patent and that said Letters Patent is hereby corrected as shown below:

The title page, showing an illustrative figure, should be deleted and substitute therefor the attached title page.

The sheets of drawings consisting of figures 1-12, should be deleted as per attached figures 1-12.

Signed and Sealed this

Thirtieth Day of November, 2010

David J. Kappos
*Director of the United States Patent and Trademark Office*

CERTIFICATE OF CORRECTION (continued)

United States Patent
Brodeur et al.

(12)
(75) Inventors: Jacques Brodeur, Granby (CA); Claude Vaillancourt, Sherbrooke (CA)
(73) Assignee: Bombardier Recreational Products Inc., Valcourt (CA)
(*) Notice: Subject to any disclaimer, the term of this patent is extended or adjusted under 35 U.S.C. 154(b) by 771 days.
(21) Appl. No.: 11/563,003
(22) Filed: Nov. 23, 2006
(65) Prior Publication Data
US 2007/0158123 A1 Jul. 12, 2007

Related U.S. Application Data
(60) Provisional application No. 60/738,979, filed on Nov. 23, 2005.

(51) Int. Cl.
B62D 25/10 (2006.01)
(52) U.S. Cl. .......... 180/69.24; 180/69.2; 180/69.21; 180/190
(58) Field of Classification Search .......... 180/69.2, 180/69.21, 9.25, 190; 296/193.11
See application file for complete search history.

(10) Patent No.: US 7,802,644 B2
(45) Date of Patent: Sep. 28, 2010

(54) SNOWMOBILE HOOD ATTACHMENT SYSTEM

(56) References Cited

U.S. PATENT DOCUMENTS

| | | | | |
|---|---|---|---|---|
| 3,572,813 A * | 3/1971 | Takada | ............ | 296/193.11 |
| 3,688,856 A * | 9/1972 | Boehm et al. | ............ | 180/190 |
| 4,437,529 A * | 3/1984 | Fralish | ............ | 180/69.2 |
| 5,048,154 A * | 9/1991 | Swartzendruber | ............ | 16/267 |
| 6,439,328 B1 * | 8/2002 | Vaillancourt et al. | ........ | 180/68.1 |
| 6,712,405 B2 * | 3/2004 | Desmarais et al. | .......... | 292/113 |
| 7,121,370 B2 * | 10/2006 | Bedard et al. | ............ | 180/69.2 |
| 7,147,074 B1 * | 12/2006 | Berg et al. | ............ | 180/190 |
| 2004/0108153 A1 * | 6/2004 | Bedard et al. | ............ | 180/190 |

* cited by examiner

Primary Examiner—Paul N Dickson
Assistant Examiner—Katy Meyer
(74) Attorney, Agent, or Firm—Olser, Hoskin & Harcourt LLP

(57) ABSTRACT

A snowmobile having a hood releasably secured to the snowmobile via interlocking male-female members, the hood being manually releasable from the snowmobile without the use of tools. A snowmobile having a hood releasably secured to the snowmobile via a hook and elastic connector, and having fairings with a moveable section constructed and arranged to conceal or cover the hook and elastic connector.

12 Claims, 11 Drawing Sheets